(12) United States Patent
Richard

(10) Patent No.: US 7,254,709 B1
(45) Date of Patent: Aug. 7, 2007

(54) MANAGED INFORMATION TRANSMISSION OF ELECTRONIC ITEMS IN A NETWORK ENVIRONMENT

(75) Inventor: Philippe Richard, Los Alamos, NM (US)

(73) Assignee: Avanza Technologies, Inc., Whittier, CA (US)

( * ) Notice: Subject to any disclaimer, the term of this patent is extended or adjusted under 35 U.S.C. 154(b) by 822 days.

(21) Appl. No.: 10/699,632

(22) Filed: Nov. 1, 2003

Related U.S. Application Data

(63) Continuation-in-part of application No. 10/643,734, filed on Aug. 18, 2003, and a continuation-in-part of application No. 10/040,933, filed on Oct. 23, 2001, now Pat. No. 7,124,435.

(60) Provisional application No. 60/403,873, filed on Aug. 16, 2002, provisional application No. 60/484,885, filed on Jul. 3, 2003.

(51) Int. Cl.
G06F 1/24 (2006.01)

(52) U.S. Cl. ............... 713/171; 713/168; 713/182; 713/189

(58) Field of Classification Search ............... 713/171, 713/168, 182, 189
See application file for complete search history.

(56) References Cited

U.S. PATENT DOCUMENTS 6,112,227 A 8/2000 Heiner
6,199,102 B1 3/2001 Cobb

*Primary Examiner*—Thomas R. Peeso
(74) *Attorney, Agent, or Firm*—Roberts Mardula & Wertheim, LLC

(57) ABSTRACT

A method for transmitting electronic information items over a network includes registering a first user via a first client machine and a second user via a second client machine with a discovery machine wherein the first client machine, the second client machine and the discovery machine are coupled to a network. A communication is initiated from the second user via the second client machine to the first user via the client machine through the discovery machine. It is determined that the first user will accept the communication and a direct link is established between the first client machine and the second client machine and the communication is delivered.

20 Claims, 19 Drawing Sheets

FIG. 12 "CLIENT AND SERVER ARCHITECTURE"

MANAGED INFORMATION TRANSMISSION OF ELECTRONIC ITEMS IN A NETWORK ENVIRONMENT

CROSS REFERENCE TO RELATED APPLICATIONS

This application is a continuation-in-part of U.S. patent application Ser. No. 10/040,933, filed on Oct. 23, 2001, now U.S. Pat. No. 7,124,435. This application is also a continuation-in-part of U.S. patent application Ser. No. 10/643,734, filed on Aug. 18, 2003, currently pending, which claims benefit under 35 U.S.C. § 119(e) of U.S. provisional patent application No. 60/403,873, filed Aug. 16, 2002. This application also claims benefit under 35 U.S.C. § 119(e) of U.S. provisional patent application No. 60/484,885, filed Jul. 3, 2003. All of applications Ser. Nos. 10/040,933, 10/643,734, 60/403,873, and 60/484,885 are incorporated by reference herein, in their entireties, for all purposes.

FIELD OF THE INVENTION

The present invention relates to information communication systems and more particularly to electronic communication systems that utilize an address.

BACKGROUND OF THE INVENTION

Over the last five to ten years, the Internet and related utilization of email has revolutionized the way businesses, entities and individuals complete transactions and communicate. Individuals can now buy goods and services and pay bills with a few clicks of a mouse. Businesses have innovated new methods of operations that streamline costs and open new channels of revenue all via the Internet. Additionally, the widespread use of instant messaging has demonstrated that the Internet is a preferred communication vehicle.

While the Internet has certainly increased a person's choice of how to interact with others, the new choices are not without disadvantages. Email, for example, is still primarily based on a standard developed in the late 1980's and does not take into account contemporary concerns for security. Security concerns encompass, but are not limited, to transfer of computer viruses, unsolicited email (spam) and ID authentication (how does a person really know an email came from the identified sender?). Additionally, once a person sends an email message, they cannot control how the information is further propagated.

Instant messaging helps to solve the discontinuity of conversations formerly conducted via email. But, if an online conversation is unexpectedly terminated, the conversation is not easily re-started since no record was kept Instant messaging also has the ID authentication issue, which can discourage its use for some individuals.

The world of e-commerce also has its drawbacks. Servers can easily be overloaded at peak holiday shopping periods. Smaller businesses often cannot afford the initial investment to create an Internet presence. Local merchants are resentful that local consumers buy goods, offered locally, from competitors in other cities. Additionally, services that require an interaction between a customer and vendor have not been adequately implemented onto the World Wide Web.

Although secure communications schemes have been developed based on the use of public/private key pairs, such schemes are not without their disadvantages. For persons to be able to communicate with an individual, that individual's public key must be available for others to use. Finding the public key of an individual to communicate with them is a hassle that inhibits the use of secure communication and goes a long way toward explaining why such schemes have not become widely adopted. Another problem arises is a user loses their private key. In that unfortunate (but all too common) circumstance, the user must acquire a new public/private key pair. This is an additional layer of hassle, particularly for all their correspondents who must now go fetch that user's new public key.

In modern society the concept of personal identity has become blurred to mean something other than what it should. It has become common to confuse the credentials that have been given to a person as being that person's identity. Confusing credentials with identity has the disadvantage that it does not establish a relationship. A person's identity should be based on their relationships with other persons, not tokens that represent credentials.

Accordingly, what is needed is a method and system to improve communication over a network or Internet, increase security and foster the growth of business of all sizes locally and in other geographic areas. What is also needed is a way to provide secure communications that does not rely on the use of public keys that are inconvenient to find. What is also needed is a way to enforce the contextual relationship that is implied by identity.

SUMMARY OF THE INVENTION

The present invention provides a system and method that allows for the authentication of individuals and control of information. Only specified users can have access to information as dictated by the owner. They can only propagate that information with the owner's permission. Also, any updates are automatically propagated to all recipients of a particular piece of information. The system and method also provides for a purely distributed computing environment for conducting business transactions.

A method for communication over a network, in accordance with the present invention, includes registering a first user via a first client machine and a second user via a second client machine with a discovery machine wherein the first client machine, the second client machine and the discovery machine are coupled to a network. A communication is initiated from the second user via the second client machine to the first user via the client machine through the discovery machine. If it is determined that the first user will accept the communication and a direct link is established between the first client machine and the second client machine and the communication is delivered.

A method for electronically distributing software, in accordance with the present invention, includes requesting a software package download from a central server via a client machine wherein the central server and the client machine are coupled to a network. The software package is downloaded to the client machine and installed. A registration of the software package is sent to the central server and the registration is passed to a manufacturer of the software package.

A method for distributing a new software product containing a communication module, in accordance with the present invention, includes disbursing a first incentive to a third party for distributing the communication module. A second incentive is then disbursed to the third party when a new user installs the communication module on a client machine and registers as an identified user of the communication module via a central server wherein the client machine and the central server are coupled to a network.

A method for selling a product over a network, in accordance with the present invention, includes contacting a product supplier by an individual wherein communication takes place over the network and interacting with the product supplier resulting in a sale of the product. The product is sent to the individual and a central server is notified that the product was sent. A payment is then released for the product to the product supplier on behalf of the individual.

A method for distributing products via a network, in accordance with the present invention, includes providing a dealer website on the network wherein the dealer website corresponds to first dealer in a first geographic area. A customer sale for a product on the dealer website is captured wherein a customer resides in a second geographic area. The product is checked for in an inventory of a second dealer in the second geographic area via a direct connection between the first and second dealer on the network. The product is delivered to the customer if the product is present in the inventory. The customer sale is reported to a central corporate server on the network from the first dealer and a sales credit is provided, from the central server, to both the first and second dealers for fulfilling the customer sale.

An advantage of the present invention is that an individual has total control of their information and who can send them messages. Conversations conducted online are recorded and can be automatically turned into an email if one party disconnects and wishes to continue the conversation. Additional benefits include providing an economical method for smaller businesses to leverage the use of the Internet for increased profitability while simultaneously not hurting local businesses.

The present invention provides a way to enforce the context (or relationship) that is implied by identity. The ability to communicate with another party is limited to the parameters of the relationship that has been negotiated (even casually) with that party. By making communications relationship-based (rather than solely credential-based) each participant in the conversation retains control over their identity and control of the information that they have made available to others by way of that relationship. This provides a return of a reasonable expectation of privacy to the user of electronic communications.

These and other advantages of the present invention will become apparent to those skilled in the art upon a reading of the following descriptions and a study of the various figures of the drawings.

DETAILED DESCRIPTION

Figure 1:
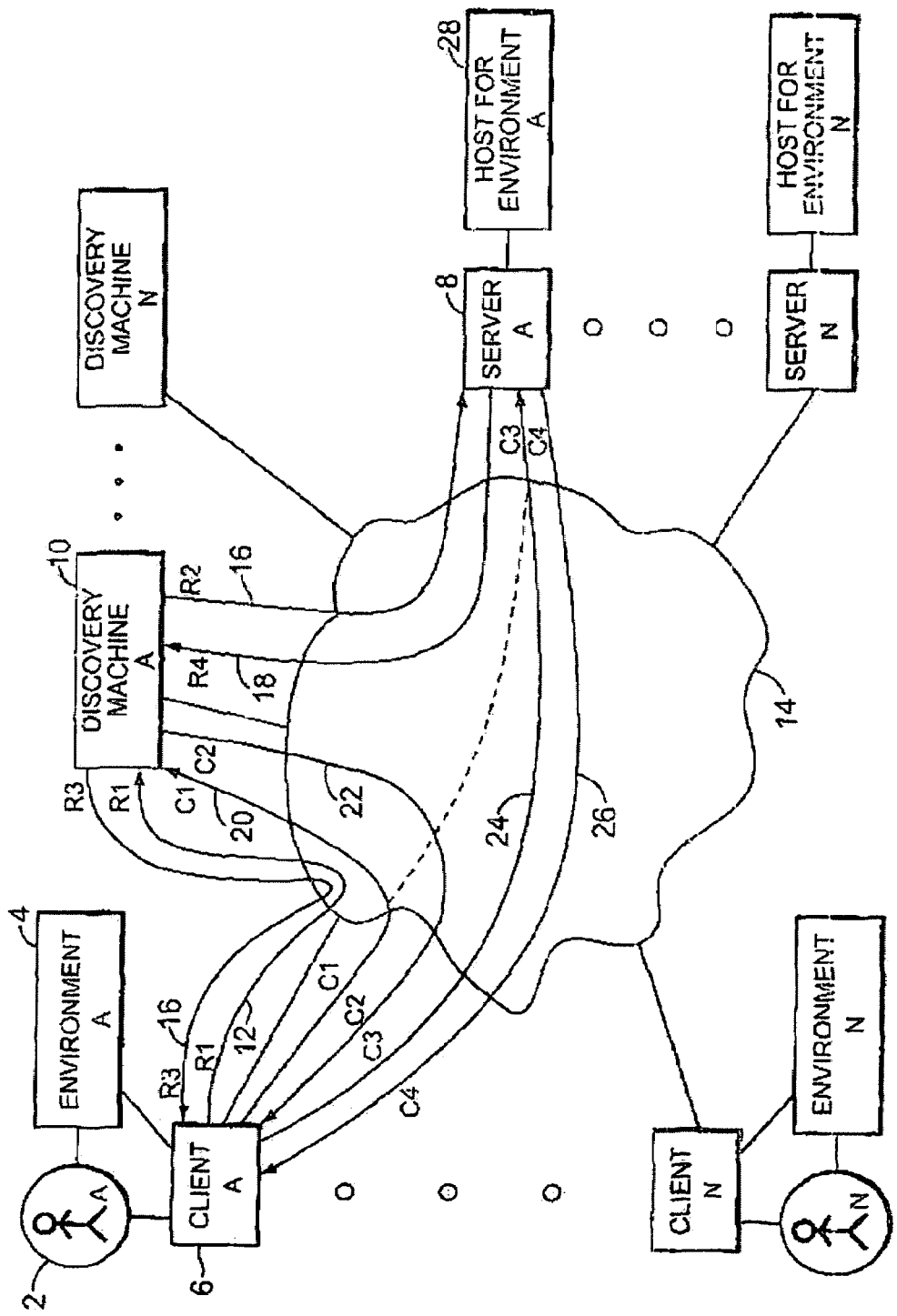
FIG. 1 illustrates the registration and connection process in accordance with the present invention.

In all aspects, the present invention allows for the authentication of individuals and control of information by the owner of the information. The person, entity, or automated machine that performs authentication may vary from application to application. A person that needs authentication in one aspect can later be the authenticating authority for another aspect. Conversely, authentication in one instance does not guarantee authentication in another, nor even continued authentication for the same application. Control of information is defaulted to the owner of the information, but in many cases complex level of ownership may arises, giving various people, entities or even automated machines various rights of control over the information.

According to an illustrated embodiment, the present invention is a method for communication over a network which involves registering with a discovery machine a first user and a second user, where the first user has a first client machine and the second user is has a second client machine. The client machines and the discovery machine are all coupled to a network. Then a communication initiated from the second user via the second client machine to the first user via the first client machine through the discovery machine. It is then determined if the first user will accept the communication, and if so, a direct link is established between the first client machine and the second client machine; and the communication is delivered. The direct link may be left open after the communication is delivered, or it may be closed either after the communication is delivered or at a predestinated time or after a predestinated event. In this embodiment, the direct link is not established if the first user does not accept the communication.

If the first user is not available to receive the communication, the discovery machine stores the communication until the first user becomes available.

In a further refinement of this embodiment, when the second user wishes to initiate a new communication with the first user, the new communication to the first user is established by a new direct link between the second user machine and the first user machine. Also, a thread of related previous communications may be prefixed to the new communication.

In the above-mentioned embodiments, either of the users can maintain a plurality of contact information. This contact information may be automatically updated when an associated user of the individual entry updates a corresponding entry locally at a client machine of the associated user.

In another refinement of the embodiment, a third user can initiate a new communication to at least one of the first and the second user via a web page interface coupled to the discovery machine. In another refinement, a third user can initiate a new communication to at least one of the first and second user through a simple mail transfer protocol via the discovery machine. In this embodiment the first and second users can selectively block the new communication, or a one-directional communication link is sent to the third user when at least one of the first and the second user replies to the new communication where the one-directional communication link allows the third user to send a future communication directly to the first or second user.

In still another refinement of the embodiment, the act of determining that the first user will accept the communication further comprises the step of storing notification of the communication if the first user is unavailable.

In this and other embodiments the discovery machine can be a central server. Further, a central server is defined as a particular server most convenient for the uses described. However, as discussed earlier, a plurality of servers, either acting as servers or client machines, may fulfill this role, and the uses of the term central server embraces all such variations.

In another embodiment a method for electronically distributing software is disclosed. This involves establishing a first identity of a client. This client is on a client machine and has the first identity. Then, a software package is requested for downloading from a central server via the client machine where the central server and the client machine are coupled to a network. The software package is downloaded to the client machine and installed. A registration of the software package is sent to the central server, and passed to a manufacturer of the software package.

As mentioned, in this and other embodiments the central server can be a plurality of machines linked on the network In a refinement of this embodiment the software package is downloaded from the central server and hosted on a distributor website for download by the client machine. Also the software package may further comprise a software product, a distributor agreement and a marketing description pertaining to the software product.

In a further refinement of this embodiment the manufacturer sends an update of the software package directly to the client machine.

In another embodiment, a method for distributing a new software product containing a communication module comprising over a network is disclosed. This involves establishing a first identity for a user, where the user is sent the new software product via the network. A first incentive is then disbursed to the user for creating a distribution setup for the new software product. A new user, that has at some point established a second identity, connects the user via the network. The user, new user, or both confirms the identity of the other, and then the new software product is transferred from the third part to the new user who installs the new software product and registers as an identified user of the new software product via a central server coupled to the network. Then a second incentive is disbursed to the user. The incentives may be a wide variety of articles, including currency.

In this embodiment, the user may also be in possession of the new software product prior to establishing the first identity.

As described earlier, in this embodiment, the first identity and the second identity is established via a discovery machine linked to the network In another embodiment, a method for selling a product over a network is disclosed. This involves establishing a first identity by an individual with a central server, as well as establishing a second identity by a product supplier with the central server. The individual then contacts the product supplier, which results in a communication that takes place over the network, where the product supplier recognizes the first identity and where the communication results in a sale of a product. The product is then sent to the individual and the central server is notified that the product was sent. The a payment is authorized and released by the central server for the product to the product supplier on behalf of the individual.

This embodiment may alternatively involve establishing the second identity occurs before establishing the first identity.

As discussed earlier, the central server may be at least two separate machines in communication over the network In another embodiment a method for distributing products via a network is disclosed. This involves establishing a first identity for a first dealer with a discovery machine linked to the network. A dealer website is then provided on the network where the dealer website corresponds to the first dealer in a first geographic area. A customer sale is then captured for a product on the dealer website for a customer who resides in a second geographic area. A second identity is then established for a second dealer with at least one of the discovery machine linked to the network and a second discovery machine linked to the network, where the second dealer is located in the second geographic area. Then a direct connection between the first and the second dealer is established on the network, and a check for the product in an inventory of a the second dealer is performed via the direct connection. The product is delivered to the customer if the product is present in the inventory, and reported to a central server on the network from the first dealer. A sales credit is then provided from the central server to both the first and second dealers.

This embodiment may included the refinement where the discovery machine and the second discovery machine are in communication over the network, are well as the refinement where at least one of the discovery machine and the second discovery machine are the central server.

FIG. 1 illustrates the registration and connection process in accordance with the present invention. FIG. 1 shows a general setup of a plurality of client machines, each of which can host a user and an environment (client A through client N where "N" signifies up to "N" number of clients). Similarly there are a plurality of server machines, each of which can host an environment (server machine A to server machine N) and discovery machines (discovery machine through discovery machine N). It should be noted that in the context of the present invention that a personal computer (PC) can take on the role of a client or server (or central server) or even both client and server.

In this example, client A, also referred to as client machine 6, can communicate with server A, also referred to as server machine 8, and a discovery machine A, also referred to as discovery machine 10, via network 14, which can be the Internet. For example, a user logs into a client machine 6 and needs to exchange information with a server machine 8 (or the server has information for the user/client). The discovery machine 10 serves as the traffic manager. By connecting a client machine 6 to a discovery machine 10, and a server machine 8 to a discover machine 10, the discovery machine 10 facilitates the establishment of a direct connection between the client machine 6 and the server machine 8. All communications between the various machines take place over the network 14.

The simplest example of the registration/connection process is between a single set of discovery, client and server machines and will now be described. User 2 operates in an environment 4, hosted on client machine 6. Both user 2 and environment 4 register (through client machine 6) with discovery machine 10, using registration connection R1 12 via network 14. Discovery machine 10 then registers server 8 using registration connection R2 16, also via network 14. The registration process is completed by discovery machine 10 by sending out registration connection R3 16 to client 6 and server 8 sends out registration connection R4 18 to discovery machine 10, again via network 14.

Server machine 8 needs to exchange information with client machine 6. Client machine 6 connects with discovery machine 10 via connection C1 20 to get the necessary location/connection information for server machine 8. Discovery machine 10 responds back with connection C2 22 with the necessary information. At this point client machine 6 directly communicates back and forth with server machine 8 via connections C3 24 and C4 26. Server machine 8 provides a host for environment 28. Connections C1 20, C2 22, C3 24 and C4 26 are all made via network 14.

Figure 2:
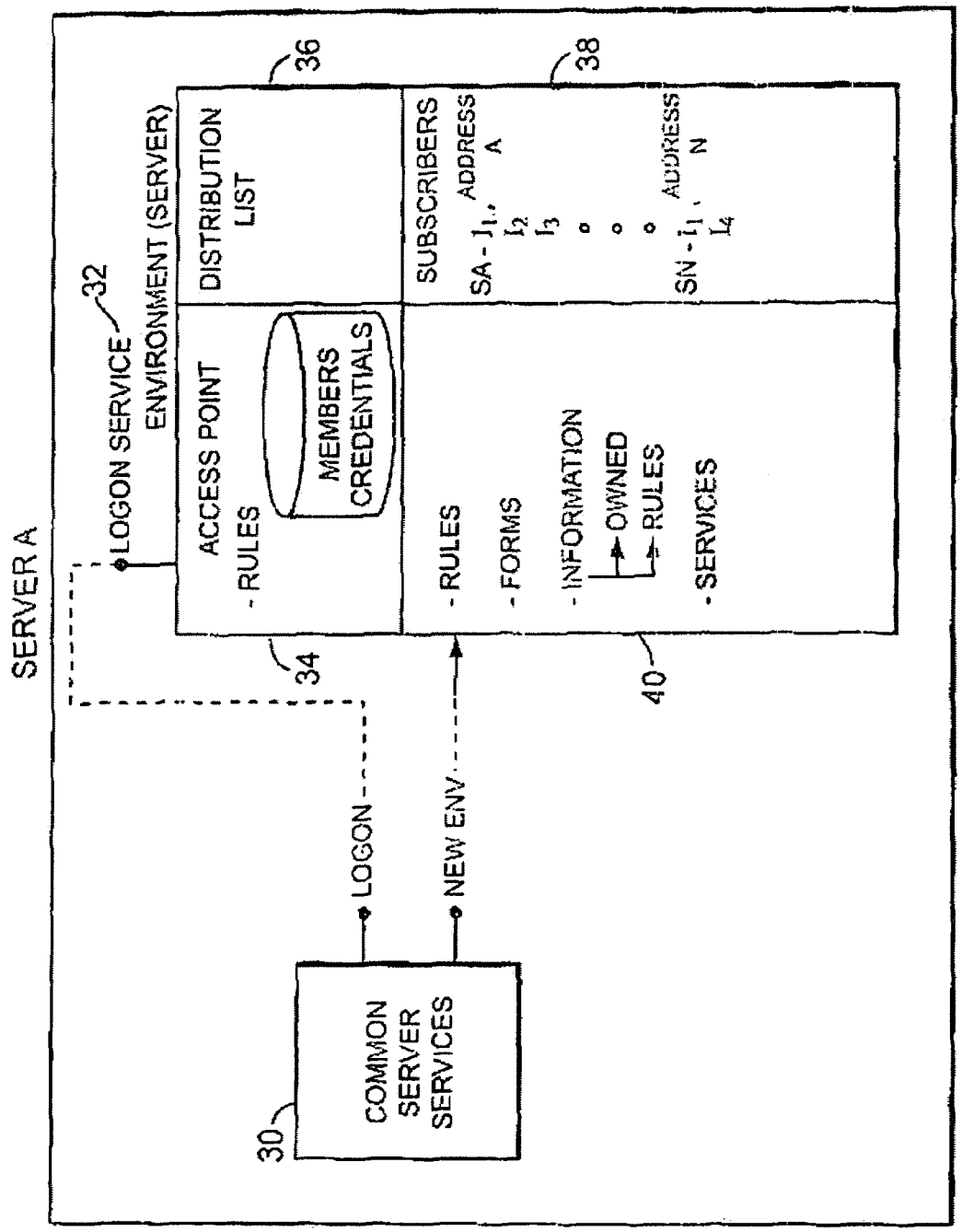
FIG. 2 illustrates the architecture of an environment hosted on a server machine in accordance with the present invention.

FIG. 2 illustrates the architecture of an environment hosted on a server machine in accordance with the present invention, specifically the architecture of the host for environment 28 (shown in FIG. 1). An environment is a collection of objects (pieces of information) that it is able to serve. It also contains rules and credentials that determine ownership as to who may access the information. Located in the common server services 30 is the gateway to the logon service 32 that allows a user access to information if the access point rules/members credentials 34 are satisfied. This can be accomplished via a digital signature. The distribution list 36 contains the list of subscribers, who owns pieces of information and who to send updates to. The subscriber list 38 contains a list of subscribers, the information they own and the address of the information. Every time a new environment is formed, it can be customized via block 40. Rules determine how information is dealt with and who has access to it. Forms define the look of the interface that a user can customize to access information. Services define the means of accessing information in the environment.

Figure 3:
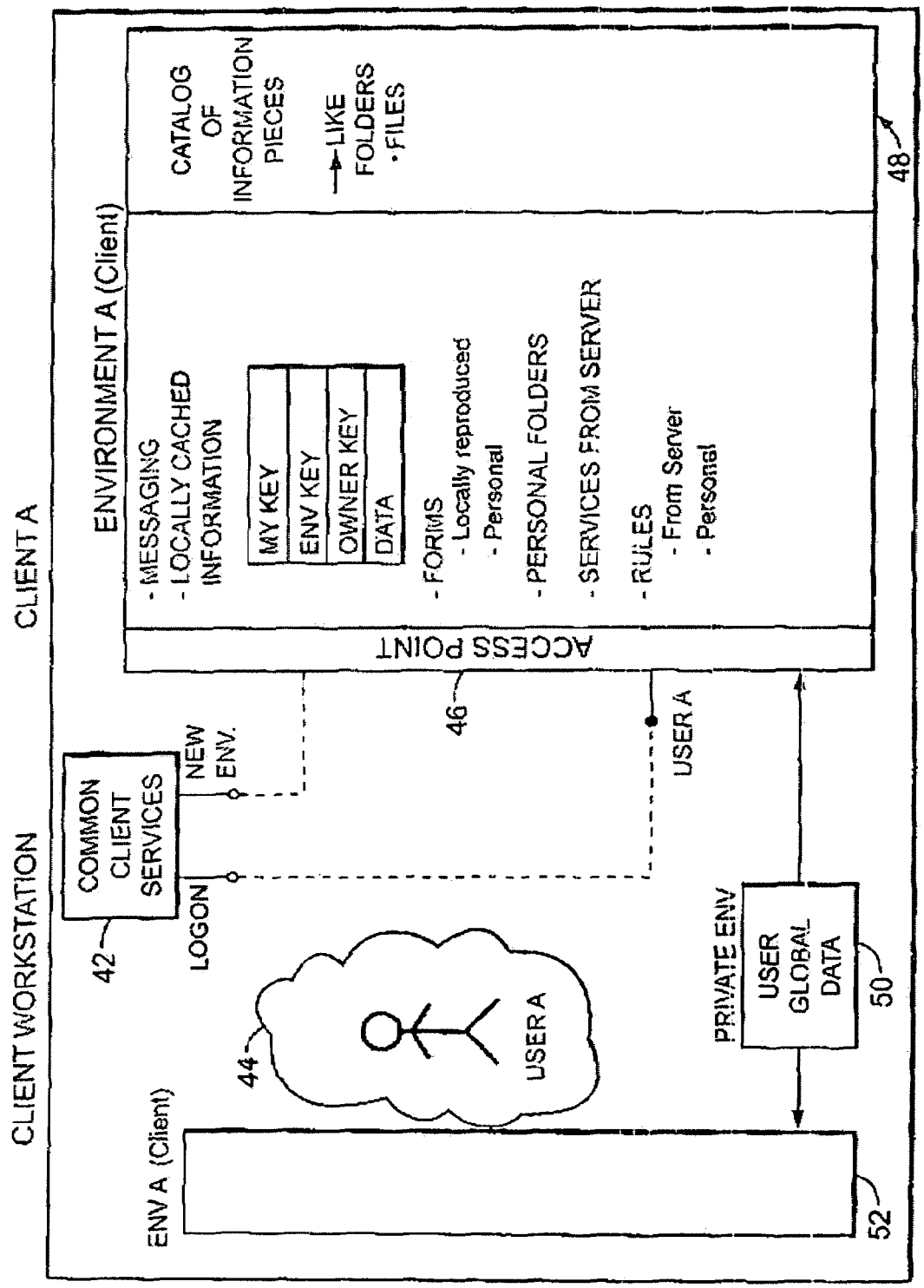
FIG. 3 illustrates the architecture of an environment hosted on a client machine in accordance with the present invention.

FIG. 3 illustrates the architecture of an environment hosted on a client machine in accordance with the present invention, specifically the environment 4 hosted on client 6. Similar to the host environment architecture, there is a common client services 42 that provides a means for logon and creating a new environment by the user 44 at access point 46. Contained in the environment is messaging capabilities to communicate with other users, locally cached information that replicates data to a local desktop, forms that a user 44 can use to customize the look of the interface, personal folders for storing information, services from the server and rules that define how the user 44 allows access by others to his information. The catalog 48 contains a list of information that is available to the user. The user global data 50 provides the connection between the environment and a host client machine 52.

Figure 4:
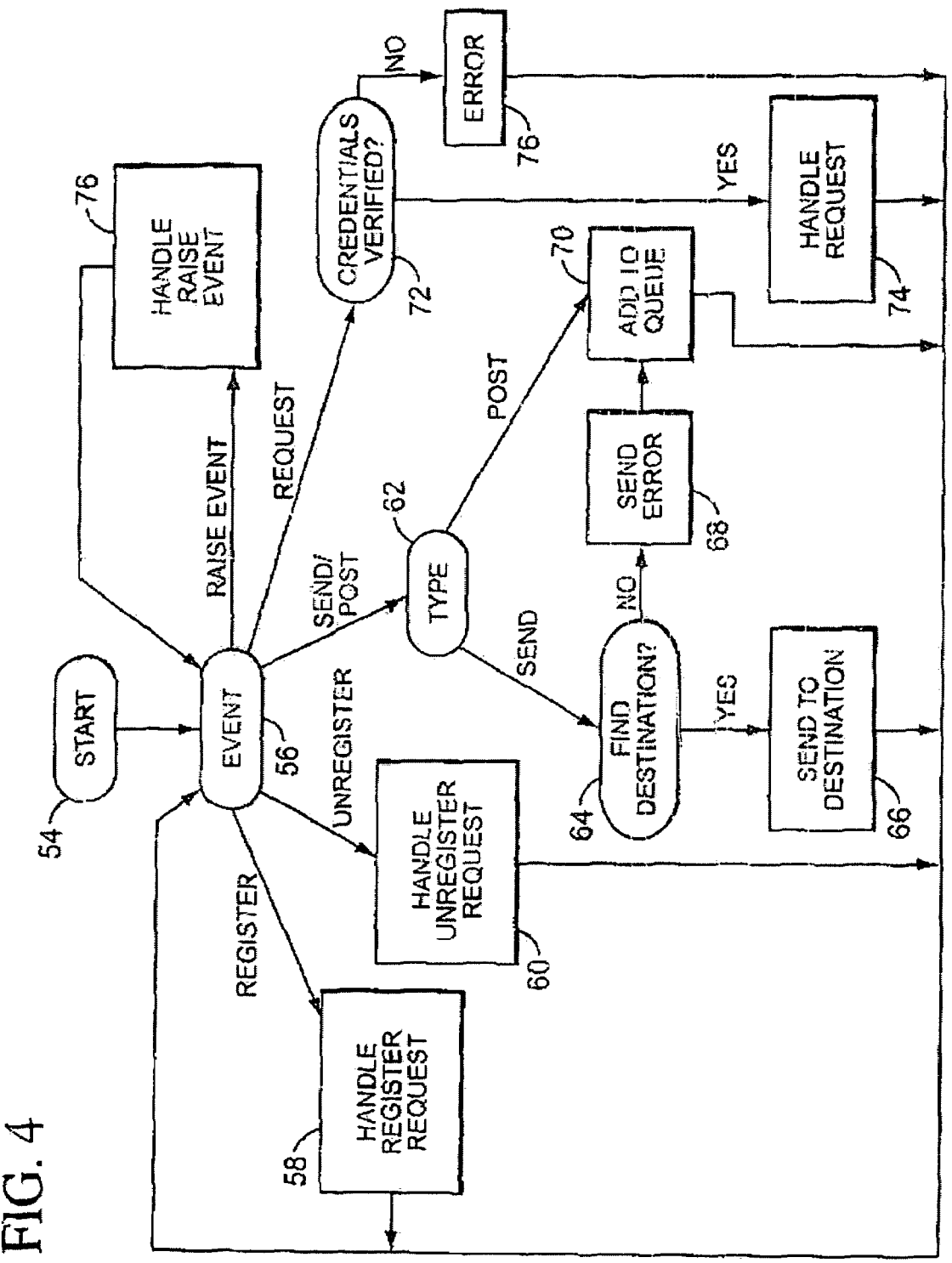
FIG. 4 is a flow diagram of an event handling process in a discovery machine of the present invention.

FIG. 4 is a flow diagram of an event handling process in a discovery machine of the present invention. As previously stated, a discovery machine plays the role of a traffic manager. It determines who is online and helps route information to the appropriate individual. If a person is not online/unreachable, it queues the information for later delivery once that person is available. Beginning at START 54, a discovery machine receives an event to handle at operation 56. A register request 58 signifies that a person has come online. The discovery machine processes this event and control returns back to operation 56. An unregister request signals that a person is going offline and that event is handled at operation 60 and control returns to operation 56.

A send/post event indicates that information needs to be exchanged. The type of information is determined to be a send or post at operation 62. A send type indicates that a person is online and the information can be sent to them right away. In this case, the destination for the information is determined at operation 64. If the destination is found, the information is delivered at operation 66 and control is returned to operation 56. If not, an error is generated at operation 68 and the information is deemed to be a post type. A post type indicates that a person is offline and therefore the information cannot be delivered and it is put into a queue until it can be delivered. After operation 68, the undeliverable information is added to a queue at operation 70. Control then reverts back to operation 56. Referring back to type operation 62, if the type was determined to be of the post variety, the information is added to the queue 70 and once again control goes back to operation 56.

A request type event defines the situation where a person requests to see if there is any send/post information for them to receive. The person's credentials are verified at operation 72. If they have the proper credentials, the request is handled at operation 74 and then control is returned to operation 56. If they do not have the proper credentials, an error is generated at operation 76 and the request is denied. Control is once again returned to operation 56.

The last type of event for the discovery machine to process is the raise event type, handled at operation 76. Raise event takes care of cleanup items such as timeouts. After a raise event type is processed at operation 76, control also returns to operation 56.

Figure 5:
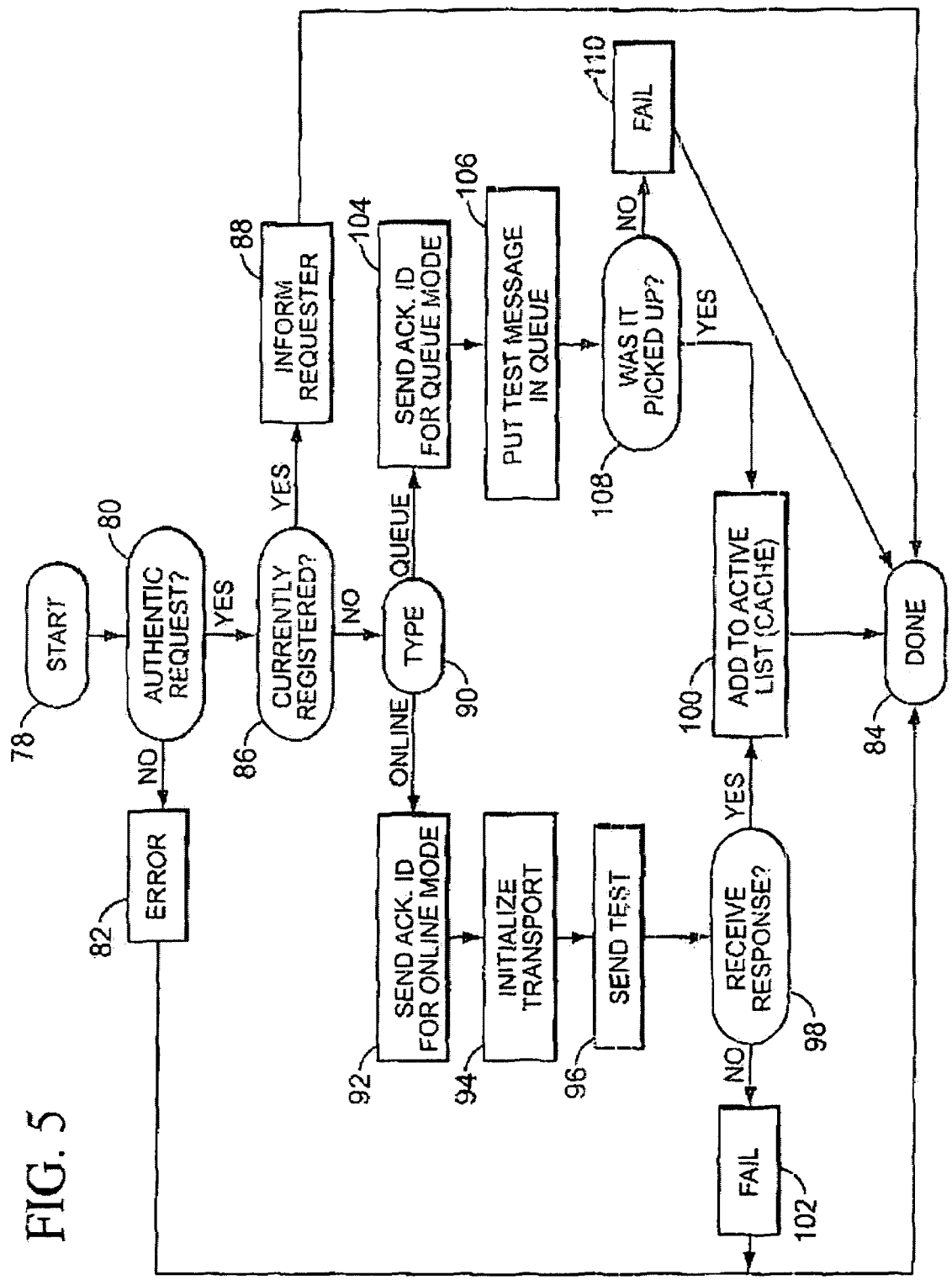
FIG. 5 is a flow diagram of a request authentication process in a host for an environment of the present invention.

FIG. 5 is a flow diagram of a request authentication process in a host for an environment of the present invention and more specifically, the functioning of the handle register request operation 58 of FIG. 4. Beginning at START 78, control proceeds to the request authentication operation 80. If the request is not a valid request (for example, the person sending the information does not have permission to send it), an error is generated at operation 82 and control is passed to DONE 84. If the request is authentic, it is determined if the person is online/registered at operation 86. If yes, the requestor is informed at operation 88 and operational control is passed to operation 84. If the person is not currently online/registered, the proper type of delivery is determined at operation 90. If the person is online and accepting messages/information, an acknowledgement for online mode is sent at operation 92. The transport is initialized at operation 94 and a test message is sent at operation 96. If an acknowledgement is received at operation 98, the information is added to the recipient's cache at operation 100. Operational control is then passed to operation 84. If no acknowledgement of the test message is received, the request fails at operation 102 and control returns to operation 84.

Referring back to type operation 90, if the person is online but not accepting messages, the information is queued and an acknowledgement identification request is sent for queue mode at operation 104. A test message is then put in the queue to detect when the recipient is online at operation 106. Operation 108 determines if the information has been picked up by the recipient. If yes, it is added to the active cache of the user at operation 100. If not, a failure occurs at operation 110. Control passes to operation 84 after operations 108 and 110 are completed.

Figure 6:
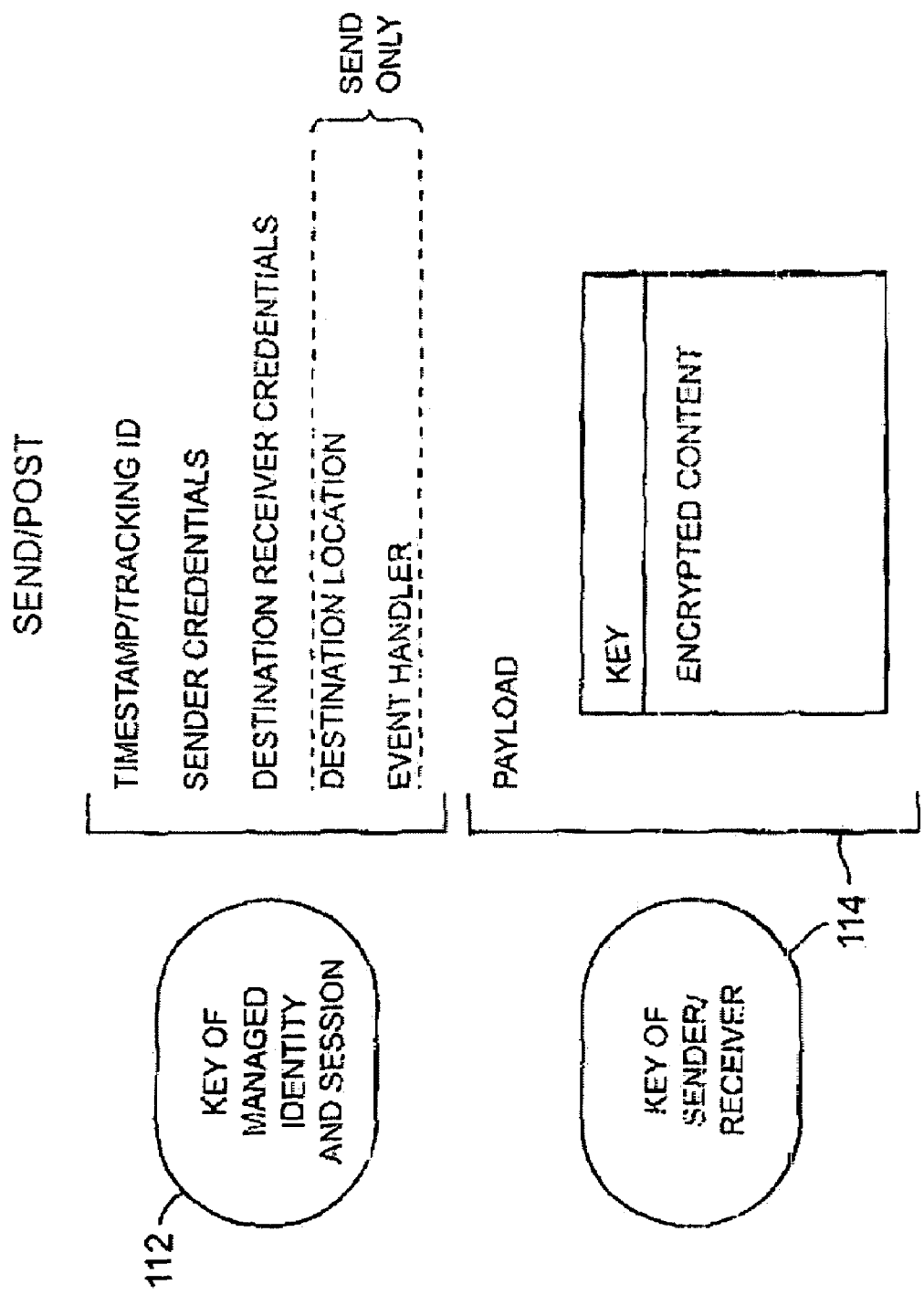
FIG. 6 illustrates the architecture of the send/post function in accordance with the present invention.

FIG. 6 illustrates the architecture of the send/post function in accordance with the present invention, and more particularly, the send/post type determination operation 62 of FIG. 4. Every message includes the encryption key of the managed identity and the session 112. Also contained in the architecture is a timestamp/tracking identification in case the information gets lost, a sender's credentials and destination information that includes the receiver's credentials. Additionally for a send type, the destination location and an event handler is included. The payload 114 contains the data being sent and encryption keys.

Figure 7:
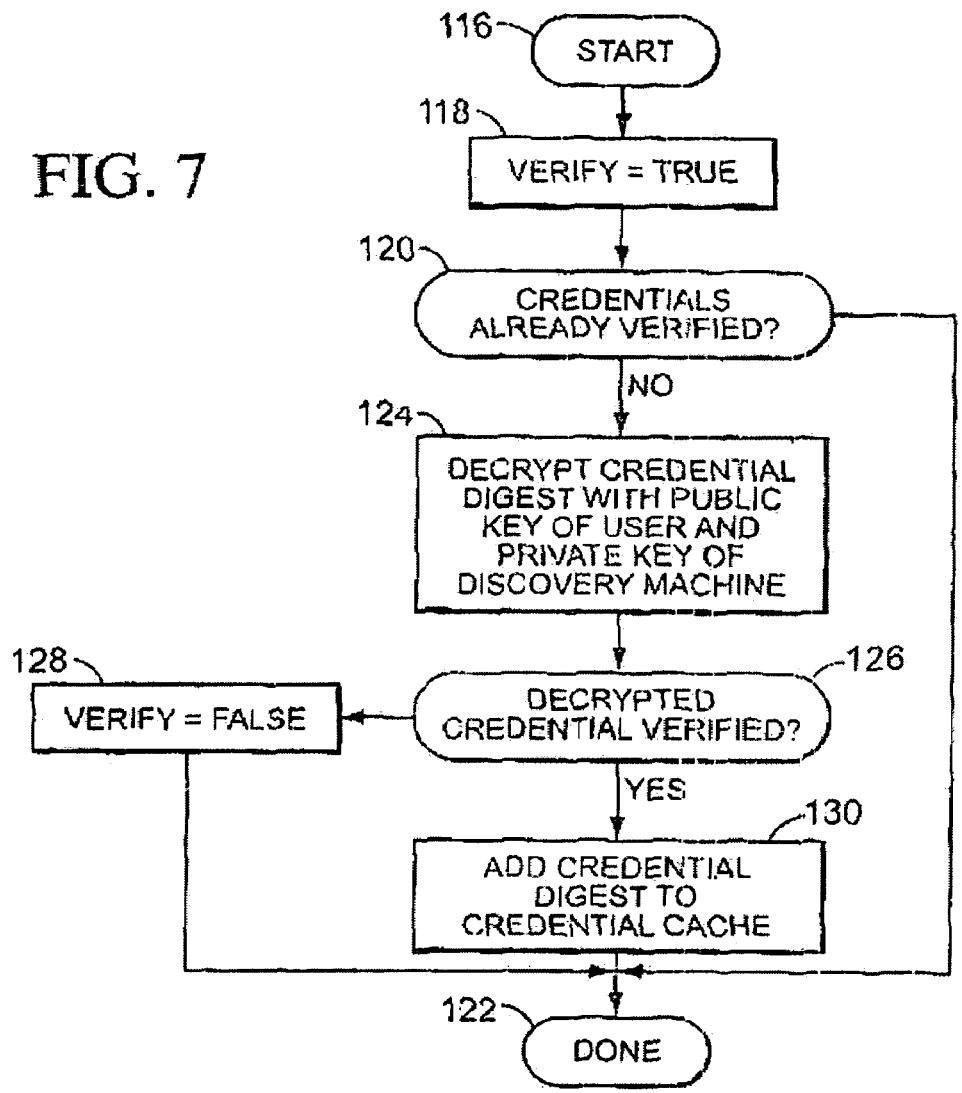
FIG. 7 is a flow diagram of a credential verification process of the present invention.

FIG. 7 is a flow diagram of a credential verification process of the present invention, and more specifically the credential verification operation 72 of FIG. 4. Beginning at START 116, control is passed to operation 118 where it is confirmed that a user needs to be verified. At operation 120, it is determined if the credentials have already been verified, if yes, operation is passed to DONE 122. If they have not, operation 124 decrypts the credential digest with the public key of the user and private key of the discovery machine. Operation 126 verifies if the credential got decrypted. If it did not, the user is not verified via operation 128. If the credential was decrypted, the credential digest is added to the credential cache at operation 130. Control passes to DONE 122 after operations 128 and 130.

Figure 8:
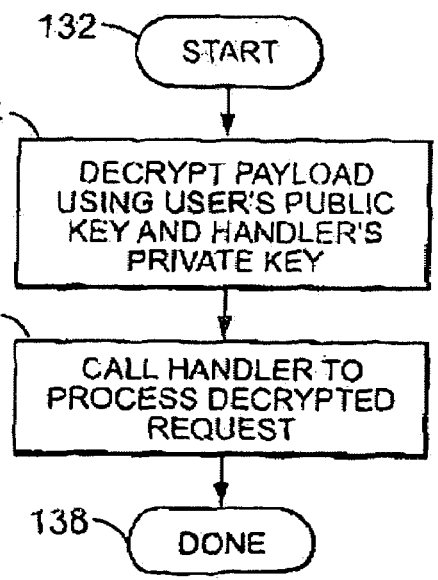
FIG. 8 is a flow diagram of a request handling process of the present invention.

FIG. 8 is a flow diagram of a request handling process of the present invention, and more particularly, the handle request operation 74 of FIG. 4. Beginning with START 132, control is passed to operation 134 where a payload is decrypted by using a user's public key and a handler's private key. At operation 136, the handler is called to process the decrypted request. The request handling process then terminates at DONE 138.

Figure 9:
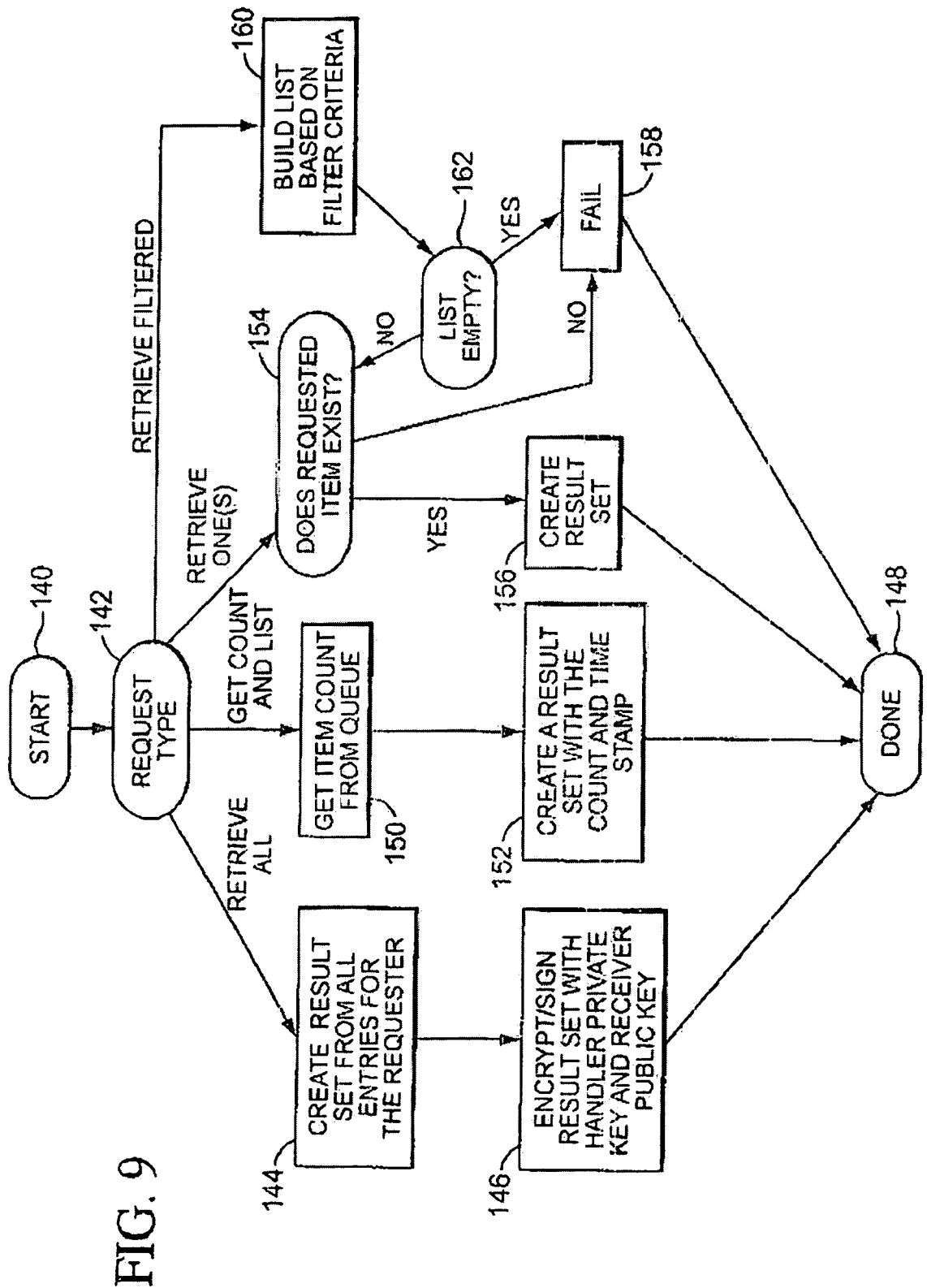
FIG. 9 is a flow diagram of a process to handle a decrypted request of the present invention.

FIG. 9 is a flow diagram of a process to handle a decrypted request of the present invention, and more specifically operation 136 of FIG. 8. Beginning at START 140, control passes to the request type operation 142. If all items need to be retrieved, operation 144 is executed where a result set is created from all entries for the requester. The result set is then encrypted/signed with the handler's private key and the receiver's public key at operation 146. The process then terminates at DONE 148. If the request type is to get a count and list, operation 150 is invoked after operation 142 and an item count is obtained from the queue. A result set is created with the count and a timestamp at operation 152 and the process ends at DONE 150. The retrieve one(s) request is performed at operation 154 where it is determined if the requested item exists. If it does, a result set is created at operation 156 and control is then passed to DONE 148. If not, a failure is generated at operation 158 and control is also then passed to DONE 148. The retrieved filtered event is performed at operation 160 where a list is built based on the filter criteria. The list is then checked to see if it is empty at operation 162. If it is not, the event is then treated as retrieve one(s) event and processed at operation 154 as previously described. If the list is empty, a failure is generated at operation 158 and the process then terminates at operation 148.

Figure 10:
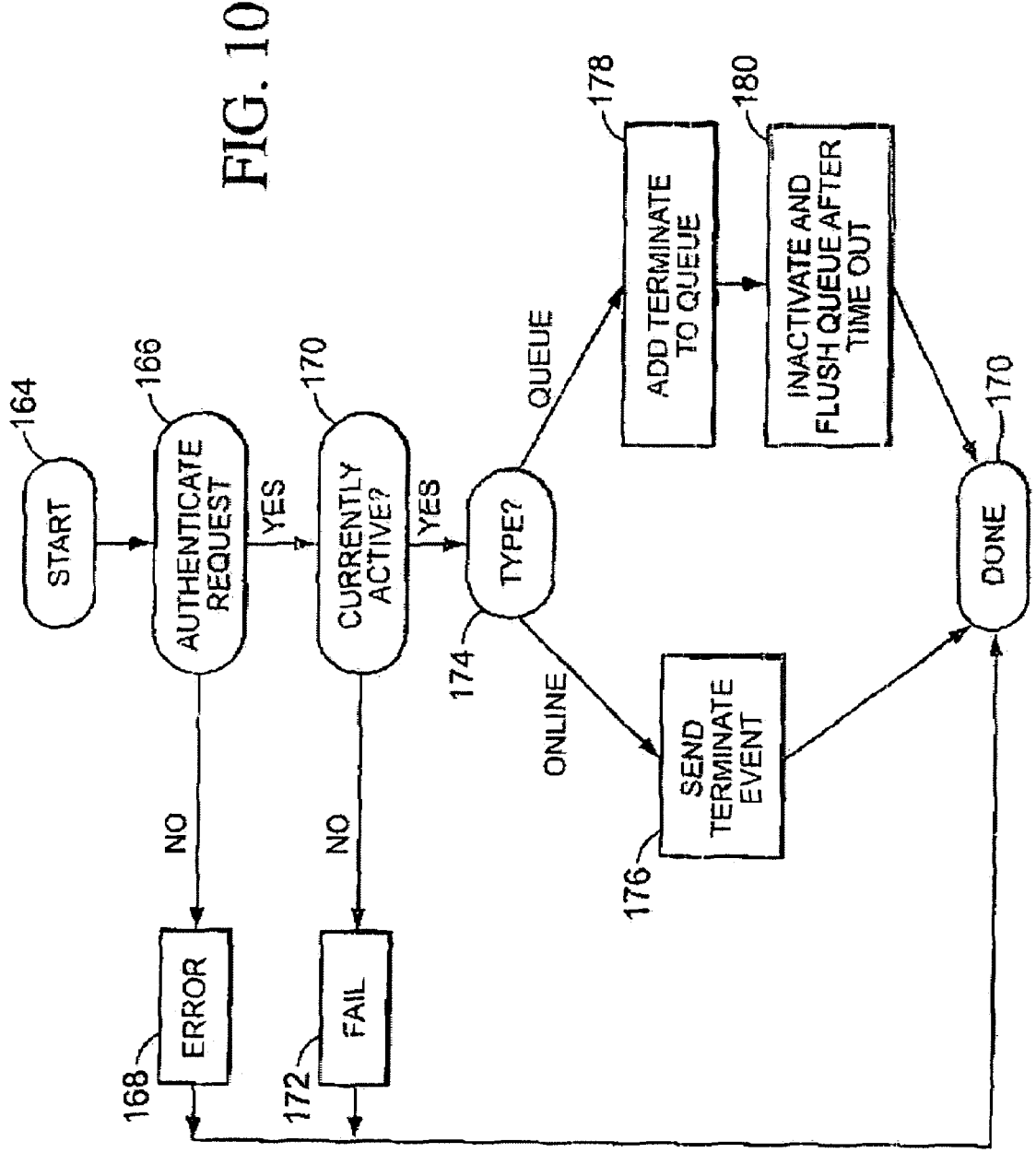
FIG. 10 is a flow diagram of a process to handle an unregistered request of the present invention.

FIG. 10 is a flow diagram of a process to handle an unregister request of the present invention, and more particularly the handle unregister request operation 60 of FIG. 4. The process begins at START 164 and proceeds to operation 166 where it is determined if the request is authentic. If it is not, an error is generated at operation 168 and the process terminates at DONE 170. If the request is authentic, operation 170 determines if the request is still active. If it isn't, a failure is generated at operation 172 and the process ends at operation 170. The type of request is determined at operation 174 if the request is still active. If the person is online, a terminate event is sent at operation 176 and control is then passed to operation 170. Alternatively, the request can be queued if the person is not online via operation 178. The queue is inactivated and flushed after a time period via operation 180 and the process then ends at DONE 170.

Figure 11:
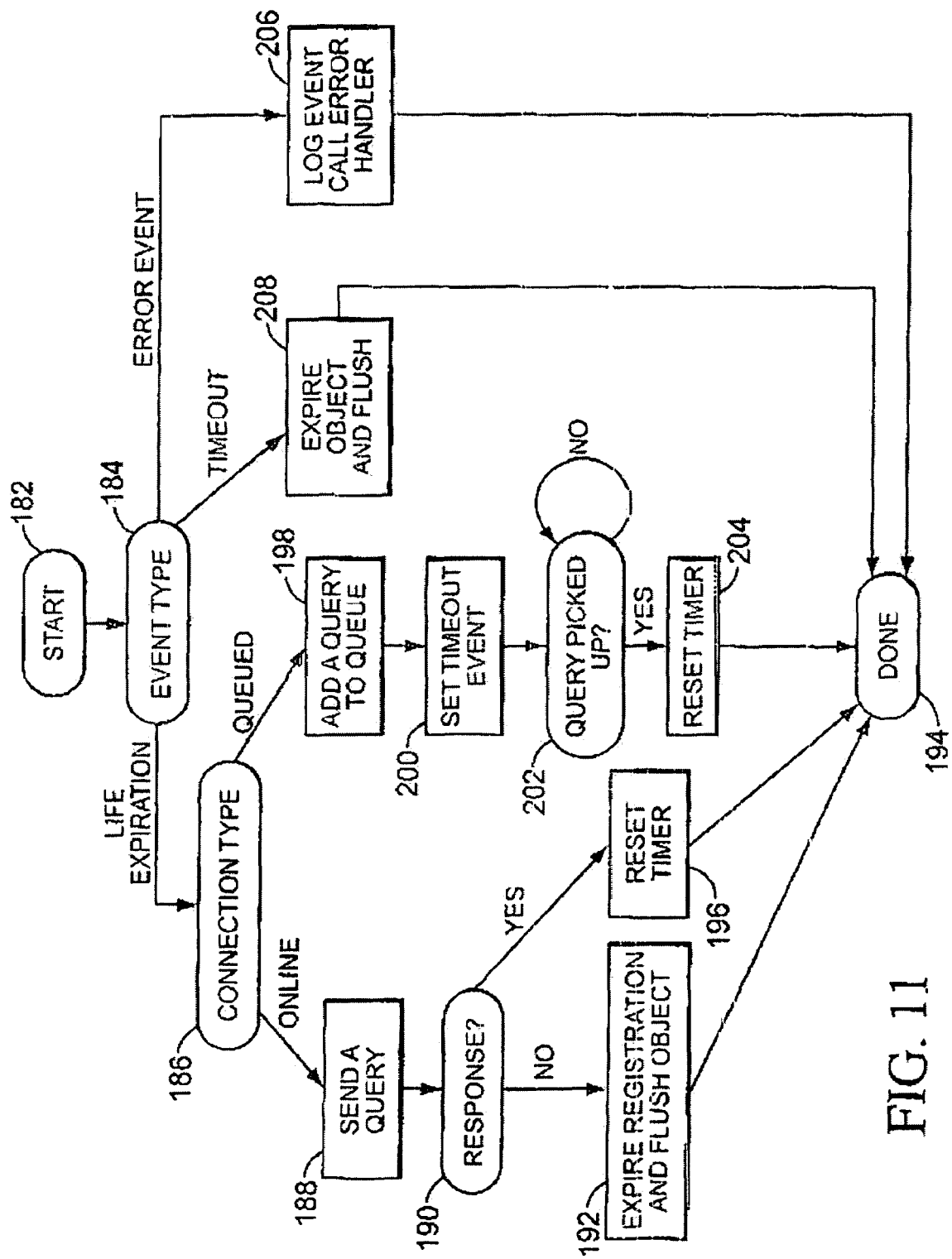
FIG. 11 is a flow diagram of a process to handle raised events of the present invention.

FIG. 11 is a flow diagram of a process to handle raised events of the present invention, and more particularly the handle raise event operation 76 of FIG. 4. The process begins at START 182 and proceeds to event type operation 184. If the event type is a life expiration, the connection type is determined at operation 186. Control is then passed to operation 188 where a query is sent if the connection type is live or online. Operation 190 determines if a response has been received. If no response is received, operation 192 expires the registration and expires the object and the process completes at DONE 194. If a response is received, the timer is reset at operation 196 and control is passes to operation 194. Referring back to operation 186, if the connection type is not online, the query is queued at operation 198. Operation 200 initiates a timeout event. Operation 202 then repeatedly checks to see if the query has been picked up. Once the query is picked up, the timer is reset at operation 204 and the process terminates at operation 194.

Continuing on with the various event types, if an error event is detected at operation 184, the event call error handler is logged at operation 206. Finally, if a timeout event is detected at operation 184, the object is expired ad flushed at operation 208. The process completes at operation 194 after bother operations 206 and 208.

Figure 12:
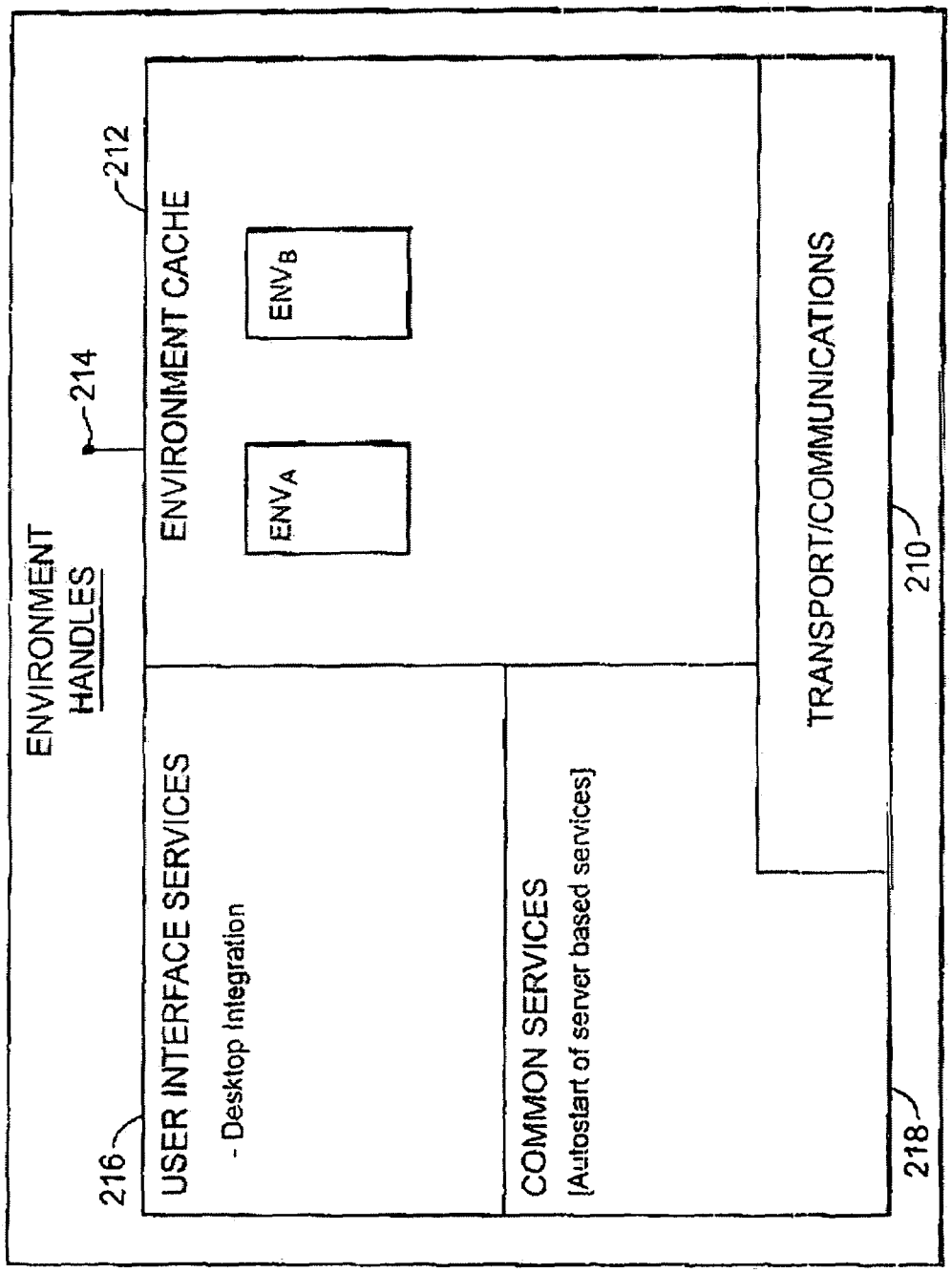
FIG. 12 illustrates the client and server machines architecture in accordance with the present invention.

FIG. 12 illustrates the client and server machines architecture in accordance with the present invention. The transport/communications block 210 handles all communication with the outside world. Some example communication protocols include (but not limited to) Internet and FTP (file transfer protocol). The environment cache 212 maintains a cache of environments. Environments can open, expire and restart here. It provides management of the caches. The environment handles 214 provides a method for the outside world to talk to the environments in the environment cache. The user interface services 216 provide for desktop integration and define what the user sees at a display. Common services are located at 218. On a server, common services are auto started. On a client, the common services start only when a user login occurs.

Figure 13:
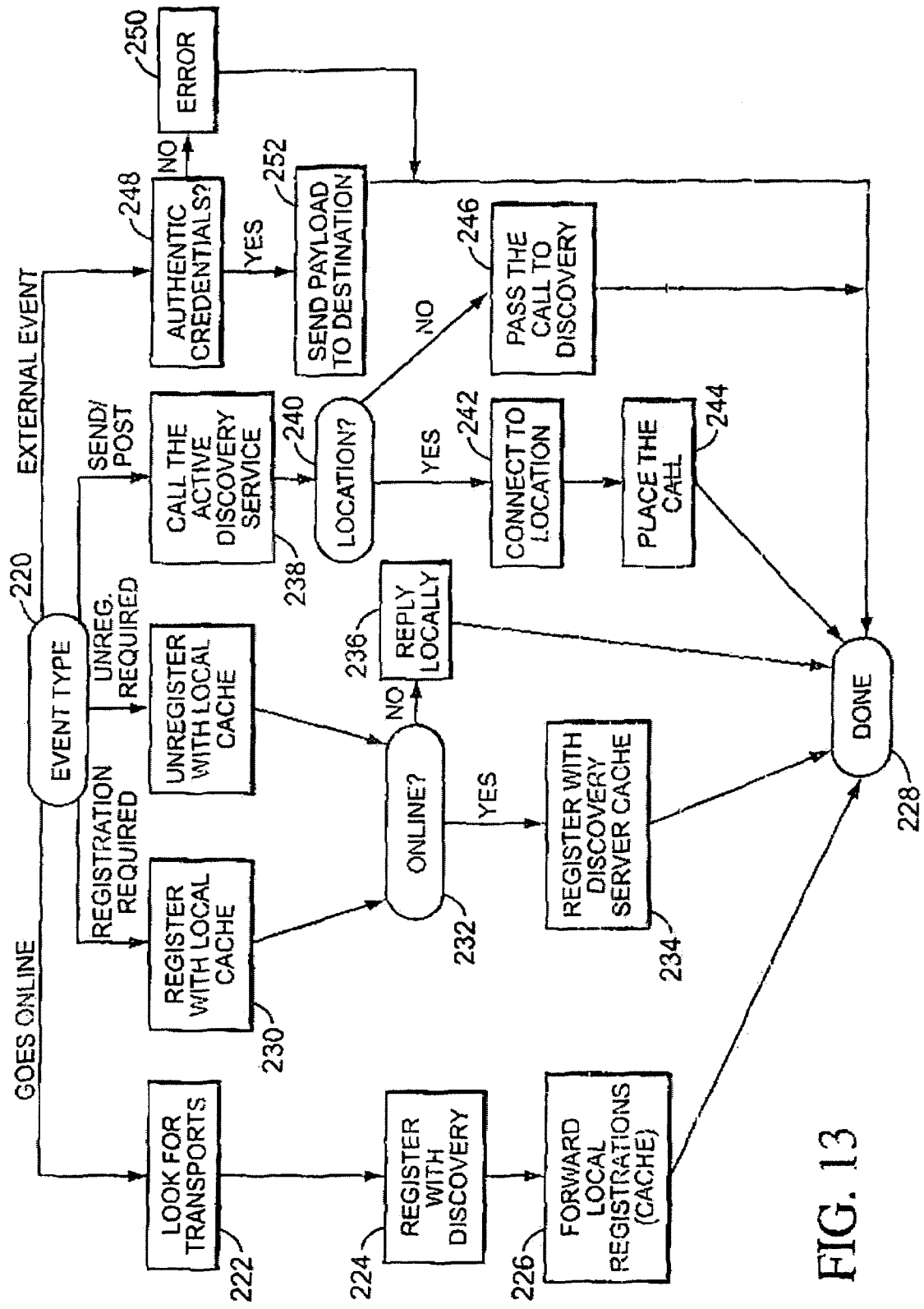
FIG. 13 is a flow diagram of a transport/communications process of the present invention.

FIG. 13 is a flow diagram of a transport/communications process of the present invention, and more specifically the transport/communications block 210 of FIG. 12. The event type is determined at operation 220. If the event is "goes online", operation 222 looks for transports. Registration then takes place with a discovery machine at operation 224 and local registrations (cache) are forwarded at operation 226. The process then terminates at operation 228. The "registration required" event type prompts the client or server machine at operation 230 to register with the local cache. Operation 232 determines if a person is online. If they are, operation 234 registers the client or server machine with the discovery server cache. Control is then passed to DONE 228. If a person is not online at operation 232, a local reply is generated at operation 236 and control again passes to DONE 228.

A "send/post" event type prompts the client/server machine to call an active discovery service at operation 238. If the location of the recipient is found at operation 240, a connection is made to the location at operation 242 and a call is placed at operation 244. Alternatively, if the location of the recipient is not found at operation 240, the information is passed to the discovery machine to be queued for a later delivery at operation 246. The process then ends at operation 228 after operation 244 or 246.

The last event type to be handled is the "external" event type. The "external" event type is the end of a send function and includes authentication credentials and it sends the payload. Credentials are authenticated at operation 248. If the credentials cannot be authenticated, an error is generated at operation 250. If they can be authenticated, the payload is sent to its destination via operation 252. The process then ends at operation 228, after operation 250 or 252. This FIG. 13 also illustrates an embodiment of the present invention where there are multiple discovery, client and server machines in various states of on and offline modes exchanging information.

Figure 14:
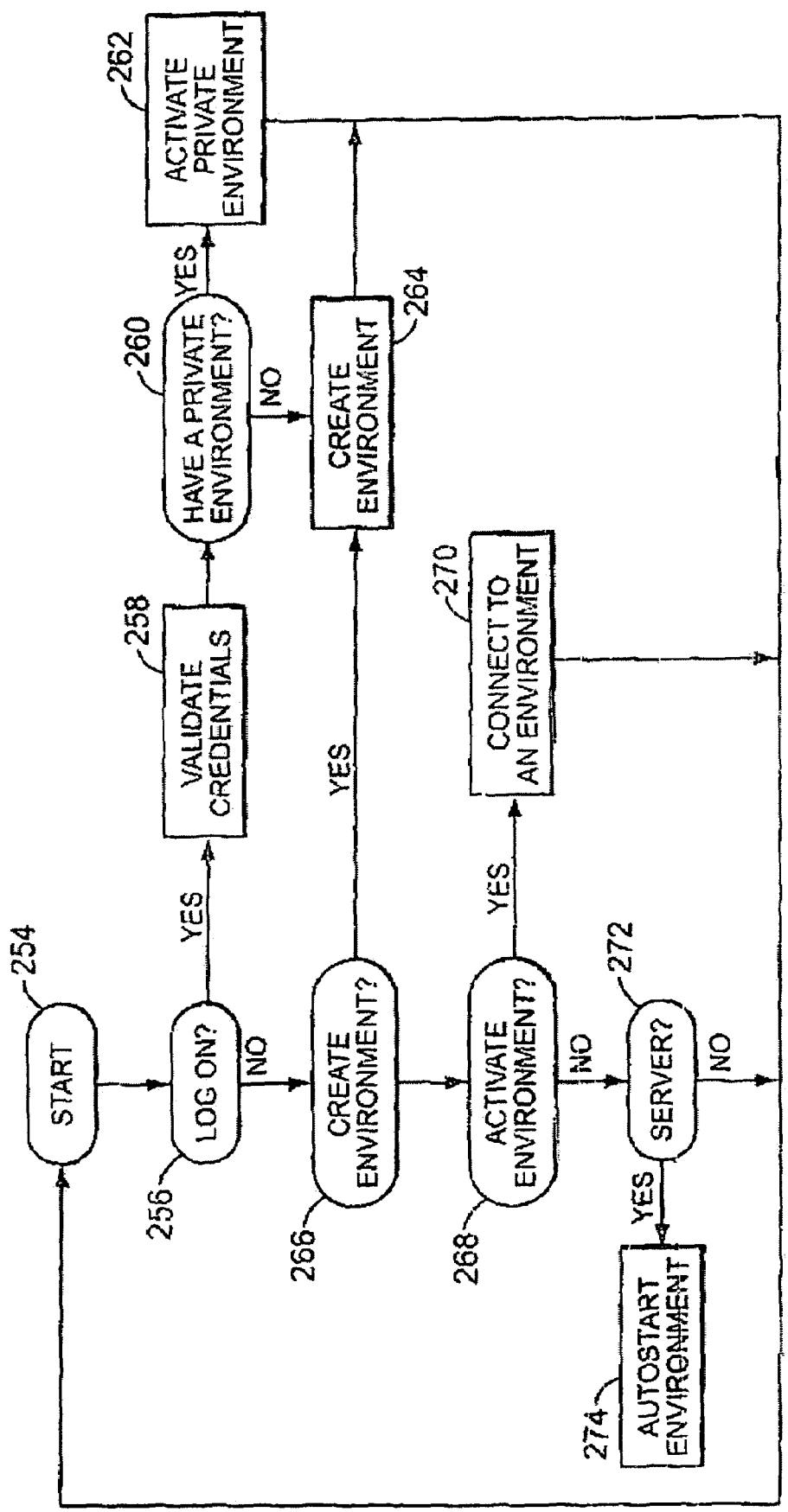
FIG. 14 is a flow diagram of common service functions of the present invention.

FIG. 14 is a flow diagram of common services functions of the present invention, and more particularly, the common services block 218 of FIG. 12. Beginning at START 254, control is passed to operation 256 where a user is prompted to logon. If a person logins, their credentials are validated at operation 258. Operation 260 determines if a private environment is required. If yes, operation 262 activates a private environment and control is directed back to START 254. If no private environment is required, a regular environment is created at operation 264 and operation is subsequently passed again to START 254.

Referring back to operation 256, if no logon occurs, it is determined if an environment needs to be created at operation 266. If yes, operation 264 is executed. If no, operation 268 determines if an environment needs to be activated. Operation 270 connects to an environment if an environment needs to be activated. If no environment needs to be activated, operation 272 determines if the machine is a server. If affirmative, operation 274 auto starts an environment. Operational control reverts back to START 254 after operations 264, 270 and 272 (if the machine is not a server).

Figure 15:
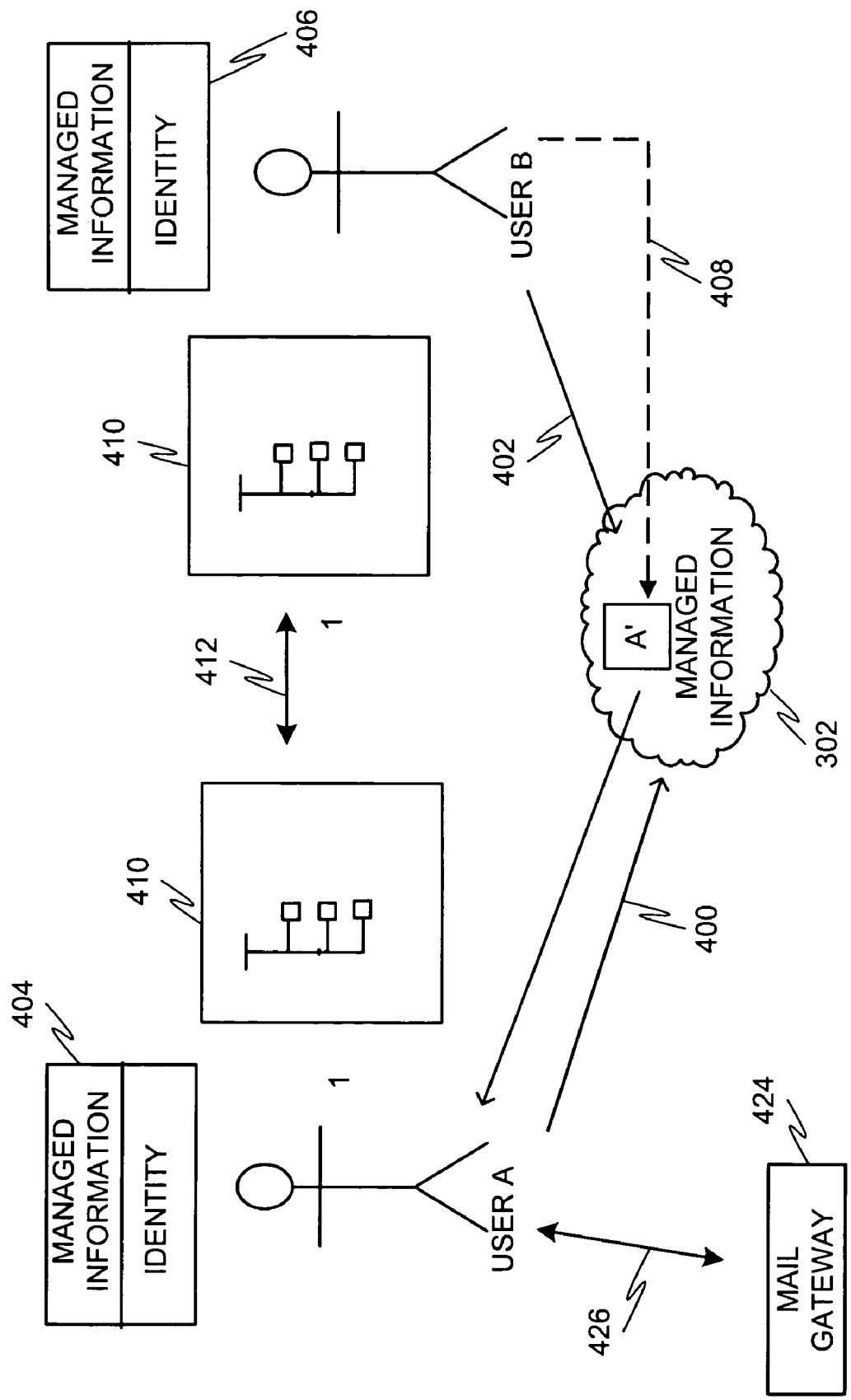
FIG. 15 a communication module process in accordance with an embodiment of the present invention.

FIG. 15 illustrates the communication module process in accordance with an embodiment of the present invention. User B wishes to communicate with user A via the managed information 302 infrastructure. Before any messages can be exchanged, both users A and B are required to register (400 and 402) and obtain an authenticated identity (404 and 406) with the managed information 302 infrastructure. Once identities 404 and 406 have been obtained, user B sends a request 408 to the managed information 302 infrastructure in order to communicate with user A. Although this example mentions only two users, A and B, the foregoing is equally applicable to group communications in that all members of the group shall establish identities.

The managed information 302 infrastructure checks the policy 410 of the owner of the group relationship (in this case user A) in regards to communicating with the members of the group (users B, C, etc.). If the policy 410 allows it, user B can then establish a direct link 412 with user A and begin a dialogue. After this initial contact, user B is then free to directly connect to user A whenever communication is desired—as long as user A permits. If it is only a group of two, then the communications are readable only by A and B, however, if there are other members of the group all members will share in the ability to read the messages. Conversely, user B is also free to decide that user A may not initiate contact. Communication can take the form of an email, live voice chat and interactive (instant) messaging. In the event that user A is not available or online to accept a message from user B, an agent A is created on the managed information 302 infrastructure and holds the message for later delivery to user A. This feature is present for when user A is unavailable for the initial communication request from user B, and for later messages once communication is established.

With additional reference to FIG. 15, the communication module process is capable of receiving and sending communications from un-identified users in a variety of methods. For example, a communication 424 can be sent via a link 426 to user A. The link 426 in one embodiment can be sent over a secure web page interface (https) hosted on the managed information 302 infrastructures. In another embodiment, the link 426 is a secure email gateway. When a message 424 is sent to user A, it is screened by the email gateway. User A has the option of selectively screening messages. If the message 424 is acceptable to user A, it is passed through the gateway. If user A then replies to message 424, any subsequent message from the sender of message 424 will be automatically passed through to user A. User A can, of course, adjust this setting at anytime.

In a third embodiment, the message 424 can be sent to user A via a free client 426. The client 426 is a small-sized executable program that allows one-way communication to user A, from the sender of message 424. The client 426 is sent to a non-identified user by user A.

Figure 16:
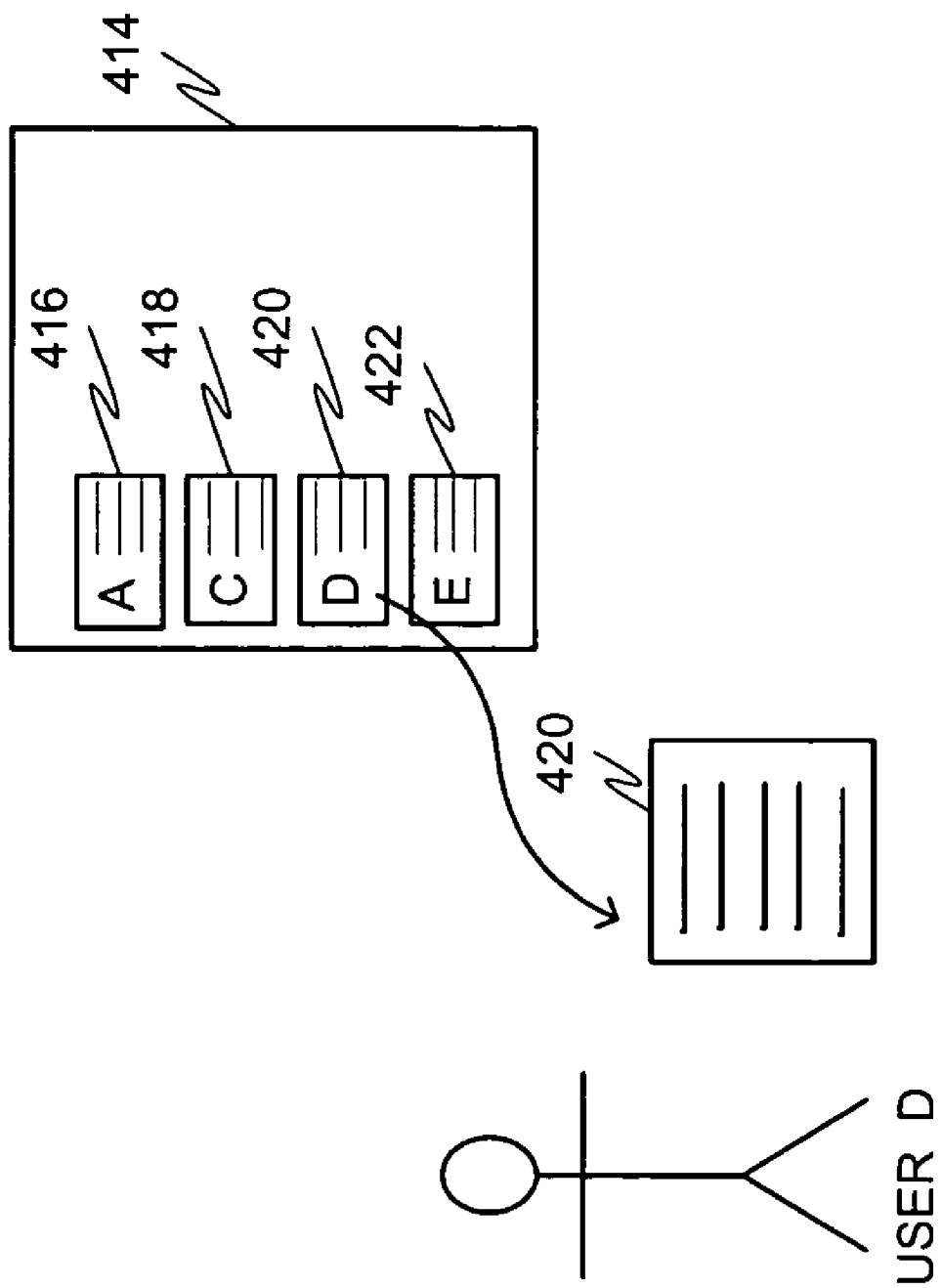
FIG. 16 illustrates a contacts list embodiment of the communication module process of the present invention.

With reference to FIG. 16, each registered user can maintain a list of contacts 414. Each individual contact 416, 418, 420, 422 contains the location of a registered user. The information, contained in each individual contact 416, 418, 420, 422, is maintained by the corresponding identified user. So, if a user D updates his local contact information 420, the update will automatically be propagated to any list of contacts that contact information 420 is located on.

A communication module process embodied according to the present invention provides a means of eliminating unsolicited emails without the use of a filter, thus eliminating the possibility of losing valuable email messages. This communication module process is capable of operating seamlessly over the existing email infrastructure. This communication module process may be deployed for a single user on a client machine or it may be deployed on a server where it can serve hundreds or thousands of users with absolutely no change to the client machines.

One aspect of the communication module process structure resides in the use of a Managed Information Conversation Agreement (MICA) that can be expressed in the form of a custom attribute in an email header, as an extension to a variety of protocols, or an email address. A MICA, as described below, is applicable to implementation of a MICA via a custom attribute in an email header, as a protocol extension, as being expressed as an email address, or other mechanisms.

A MICA represents a self-verifying authorization to communicate with a specified identity. A raw MICA has the following format:

<O>.<R>.<C>

The <O> portion is a string representation of a public key created by the identity that owns this agreement. Each MICA generates a different key in order to ensure that multiple MICA addresses can never be cross-referenced back to a single owner. The owner of the MICA ordinarily keeps the private key. According to an alternate embodiment, the owner designates a trustee domain to handle key management.

The <R> portion is a string representation of the identity that is authorized to use this address. The string is created by computing a hash value from the information specified by the <C> field and encrypting it using the private key of the MICA and the public key of the trustee domain. This enables the MICA relationship owner to validate messages being sent to the email address corresponding to the MICA.

The <C> portion is a short string identifying the level of credentials required to authorize communications access. This field allows the owner of the MICA relationship to advertise the level of identification that is required for messages to be accepted under the terms of a MICA. This field is part of the content used to create <R> to ensure that the field cannot be tampered with when the MICA is used to send a message back to the owner.

One example of a process that is useful to create a MICA is as follows:

Generate a new public/private key pair.

Convert the public key into a string to create the <O> field of the MICA.

Select the desired value for <C> and retrieve the value of each item that will be required for the credentials. This will always include the email address of the recipient, but it can include any other credential as identified by the <C> field (possibilities include the IP address of the mail server used by the recipient, custom mail attributes that are expected to be present, etc.).

Using all the information required by <C> compute a hash of the information (including the values of <C> and <O>)

Encrypt the result using the private key of the MICA and the public key of the trustee.

Convert the result of the prior step to a string to obtain the <R> field.

The assembled format of the MICA can now be obtained by concatenating the fields in the form <O>.<R>.<C>.

The resulting MICA can now be used in any email message sent to the email address identified in the creation of the <R> field, for example as part of an email address in the FROM portion of the message.

The private key of the MICA is to be stored in a secure location and is to be available for the verification process.

A powerful aspect of a MICA resides in the fact that it is easy for the owner of the relationship corresponding to that MICA to verify email messages sent utilizing that MICA in the email protocol. An example of a procedure for making such a verification is as follows:

The MICA relationship owner looks at the <C> field in the email address to confirm what credentials are required. All required credentials must be available in the header of the email message.

The MICA relationship owner collects all the information from the message and computes a hash (including the values of <C> and <O>).

The MICA relationship owner decrypts field <R> using its private key and the public key of the MICA.

The MICA relationship owner encrypts the hash using the private key of the MICA and the public key of the trustee.

The MICA relationship owner then converts the result to a string and compares it to field <R>.

If the values are the same this is a legitimate use of this MICA address and the message is verified to the MICA relationship owner.

If the values are not the same this is not a legitimate use of the MICA address the message can either be thrown out or the owner can designate what action should be taken.

The MICA can never be reproduced exactly, because the production process includes a randomization factor. Nevertheless, any use of the same MICA will always be verifiable. As an example of how to implement such a MICA creation protocol, computer code for implementation of this feature is attached to this application as an Appendix.

The MICA communication protocol provides for public key management and distribution without need for a central public repository. Each public key is unique to each relationship. A relationship may be shared simply between two identities, or it may be shared for an entire group. Thus, a group public key (like that for a two person communication) is unique to each group.

Although there is not strictly a need for a central public repository to practice the present invention, there still may remain situations where MICA relationships having particularly high security requirements will utilize careful handling of how encryption keys are distributed from an issuing entity. The hash for the key is forwarded through a back channel, for example, that is implemented as a courier delivery of a paper letter with a code printed thereon, or via an email message containing a link to a secure web site that distributes the code, or by courier delivery of a USB key drive, or courier delivery of a smart card.

Licensing of what is permitted in the relationship is embedded in the MICA. This is described above as being the <C> portion of the MICA. Examples of parameters that are defined by the MICA license are expiration date, renewal terms, rights permitted by the various identities admitted to the MICA, limitations on the use of the MICA, and security requirements.

As an example, Alice, a user of a thusly-embodied communication module process, obtains the following benefits:

Every contact has a different MICA to Alice and that MICA cannot be used by anybody else unless Alice chooses to permit it.

Alice retains a publicly know email address, but that address is protected so that only verified users can get through.

Alice is able to subscribe to as many newsgroups, web sites, etc as she wants to without any problems. Each site has a different MICA for her and the MICA cannot be mapped to the MICA used at other sites—thus making it impossible for somebody to cross-reference information about Alice across sites and online databases.

Alice always knows exactly who has given her MICA to somebody else and this information can be proven.

Alice always has the possibility to protect her identity so that the email address she provides cannot be traced back to her by the recipient. However, if Bob was also using a communication module process according to this embodiment, he would be able to know if the same person is communicating with him in subsequent messages—although this would not provide Bob with any information other than the knowledge that this is the same person.

When Alice establishes a conversation with a contact she has the option to automatically synchronize whatever information she wants with her contact and vice-versa. For instance, Alice might want to keep her office number and address synchronized with all her contacts and vice-versa.

A communication module process according to the present invention can be used in many ways. One example of is that it may be used to communicate between two individuals who each have the communication module process according to the present invention implemented on their computers. Another example is where it is used to communicate between one individual who has the communication module process according to the present invention implemented on his computer and another individual who does not. Yet another example is that it may be used to communicate among a group of more than two individuals who each have the communication module process according to the present invention implemented on their computers, the membership of this group being controlled exclusively by the owner of the MICA group relationship.

Figure 17:
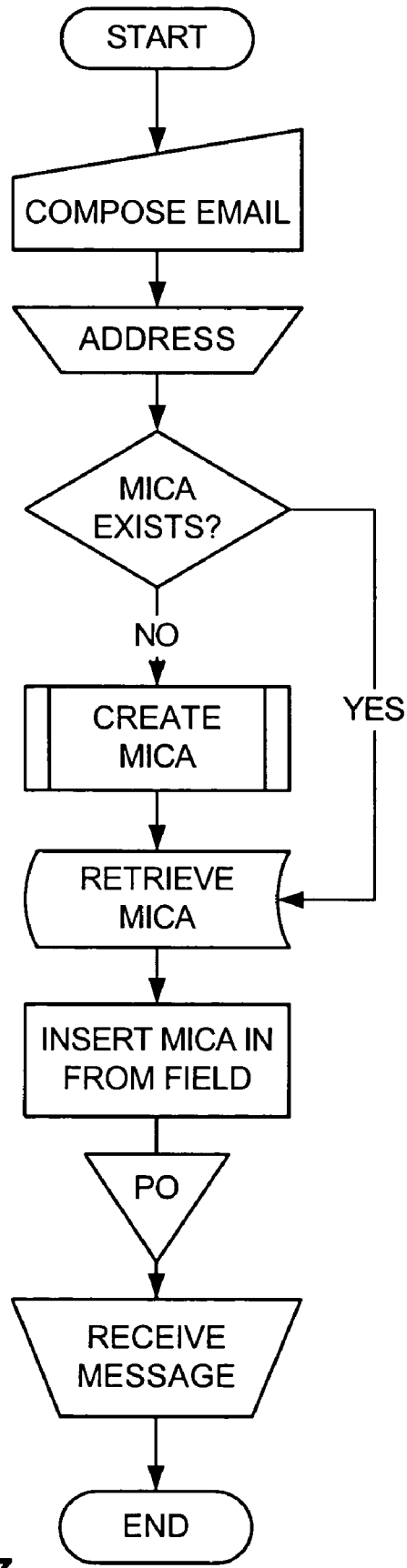
FIG. 17 illustrates a flow chart of a process according to an embodiment of the invention for transmitting managed information messages as an overlay of conventional email.

Referring to FIG. 17, a flow chart is illustrated of a process according to an embodiment of the invention for transmitting managed information messages as an overlay of conventional email. Initially the email message is composed by a sender who has the communication module process according to the present invention implemented on his computer. The sender then chooses the intended recipient's email address from his address book or simply types in the intended recipient's email address. The communication module process checks to see if a MICA has already been created for the intended recipient. If necessary, a new MICA is created. If a MICA has already been created it is retrieved, either from the senders address book, or from a server hosting the communication module process. The FROM field of the email message is modified to contain a MICA-formatted email address as retrieved. The email message is then process by the mail server like any other message. Even if the intended recipient is not a user of an embodiment of the communication module process according to the present invention, the recipient receives the email message just like any ordinary message.

When a user of an embodiment of the communication module process according to the present invention receives a message that has an attached MICA, there are at least four possible outcomes. The first is that the MICA process succeeds because the MICA addressing is correct for the combination of recipient and sender. The other three are failure modes, in the event that the MICA addressed message is received from an inappropriate sender. The message may be simply thrown out. The message may be forwarded to the MICA user who would have been the appropriate sender, asking them to clarify the appropriateness of the unfamiliar party to whom they had likely forwarded the MICA address. A third failure scenario is to automatically reply to the inappropriate sender with a challenge to establish a MICA relationship according to the communication module process.

The communication module process according to the present invention has applicability beyond merely email. It is also useful as a secure communications plug-in, for example for use with an Internet browser. It is useful for communicating securely with a web site, to ensure that the web site operator does not inappropriately propagate one's communication coordinates (i.e., sell one's email address to spammers).

It should be noted that the structure of MICA is independent of the managed information infrastructure described above with respect to FIGS. 1-14. The managed information infrastructure disclosed is simply one example of how MICA may be supported, and is not the only way the invention may be practiced.

Figure 18:
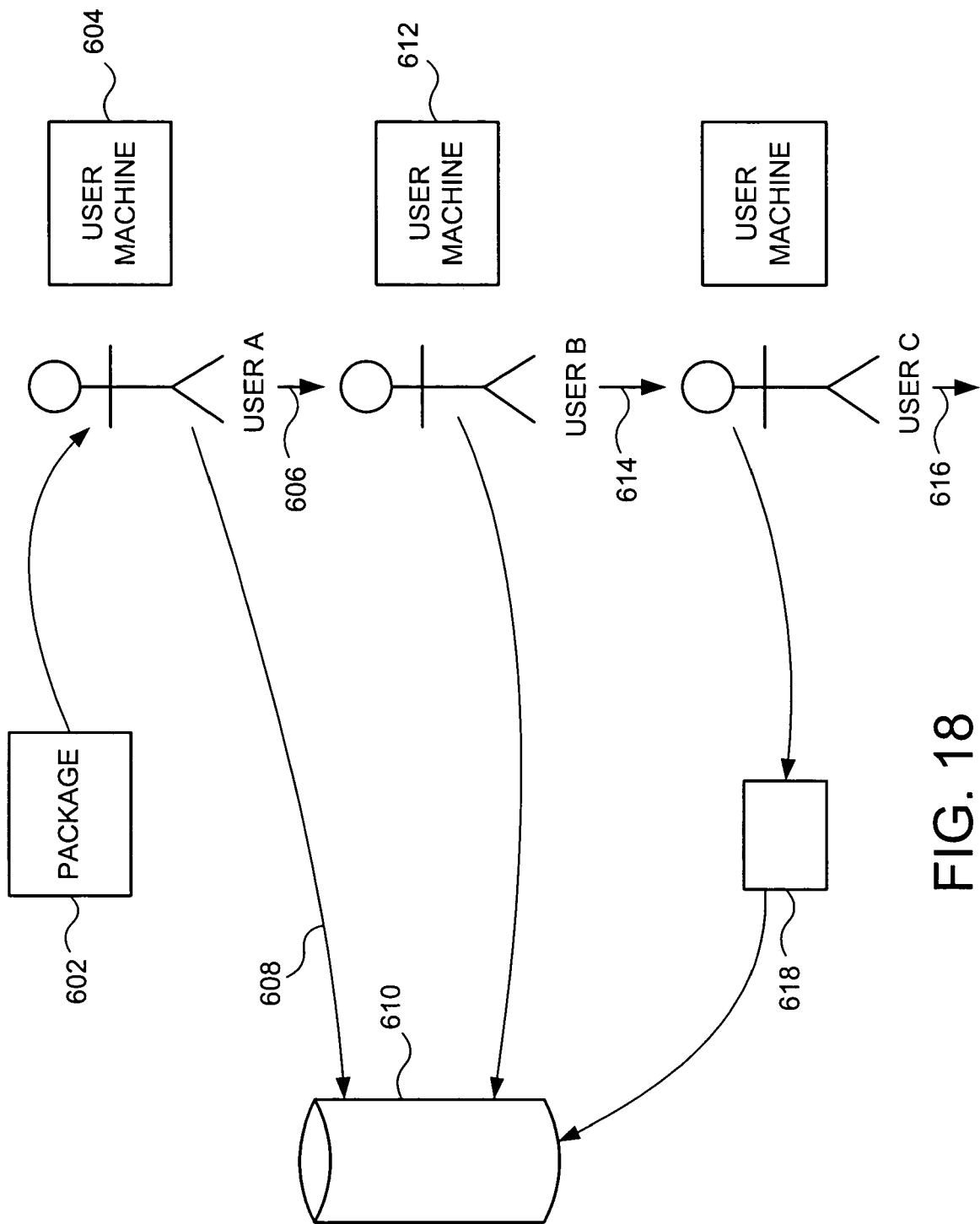
FIG. 18 illustrates an incentive-based software distribution process in accordance with an embodiment of the present invention.

FIG. 18 illustrates an incentive-based software distribution process in accordance with an embodiment of the present invention. The incentive-based software distribution process is a specific implementation of the electronic distribution system for software process. User A is an identified communication module user and is hosting an managed information package 602 (containing an communication module software package), hosted on an managed information environment 604, for the primary purpose of distributing the managed information package 602. As an added bonus, user A is given a fixed amount of money for each download of the managed information package 602 from user A's managed information environment 604, as well as a one-time flat fee for hosting. As a result, user A actively promotes the use of communication module and convinces user B to try it out. User B downloads the managed information package 602 and becomes an identified communication module user. Information about the referral 606 is sent to the managed information infobase 610 via link 608 and user A subsequently receives his referral incentive (not shown).

User B then decides to make some easy money and distribute communication module as well. User B allows downloads of a branded communication module package (not shown) from his managed information environment 612. User C downloads 614 an communication module package from user B and user B receives his money. At this point, user C decides to and become a distributor for the full software package (communication module and electronic distribution system for software). User C can then begin to sell and makes a sale/download 616 another user. User is additional user can pay through user C who then passes the information to a third party payment processor 618, which subsequently sends payment to the managed information infobase 610. User C is also eligible for the incentives and receives a referral reward for the additional user's purchase, in addition to the one-time hosting award.

The incentive-based software distribution process advantageously encourages people to host a software package since they receive money just for that simple act as well as a per download bonus. Since each new identified user is also eligible for the incentive, distribution of the software can become widely available and not dependent on a central download server. Also, the only central piece of information that needs to be maintained is a token that identifies each individual user. Tokens are maintained at the managed information infobase.

Figure 19:
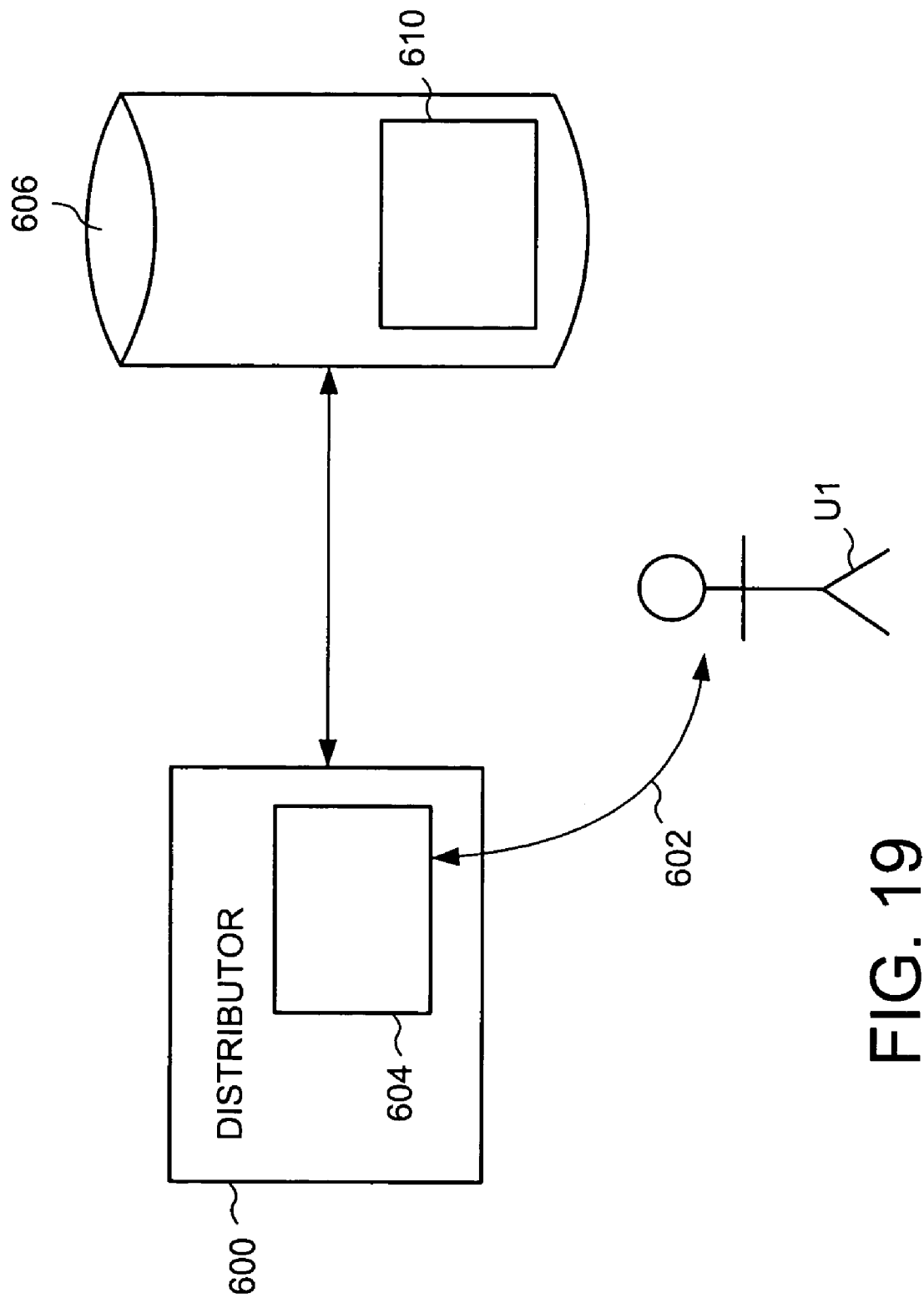
FIG. 19 illustrates an involved business transaction on a network process in accordance with an embodiment of the present invention.

FIG. 19 illustrates the involved business transactions on a network process in accordance with an embodiment of the present invention. The involved business transactions on a network process is applicable to business transactions that require a dialogue before a transaction occurs. Some examples of this may include the sale of coffee and professional services that require personal information before a price quote is offered. These transactions also, typically, are not paid for until verification that the services have been rendered or the product has been shipped to the customer. To illustrate, customer/User U 1 talks with vendor via link 602. Vendor 600, residing in a managed information environment, has the information concerning its product or service in a managed object 604 that is capable of a two-way dialogue with the end customer. Once all the necessary information has been collected and the order has been shipped or services rendered, vendor notifies the involved business transactions on a network server 606, via link 608. The vendor is then compensated according to a policy 610.

Figure 20:
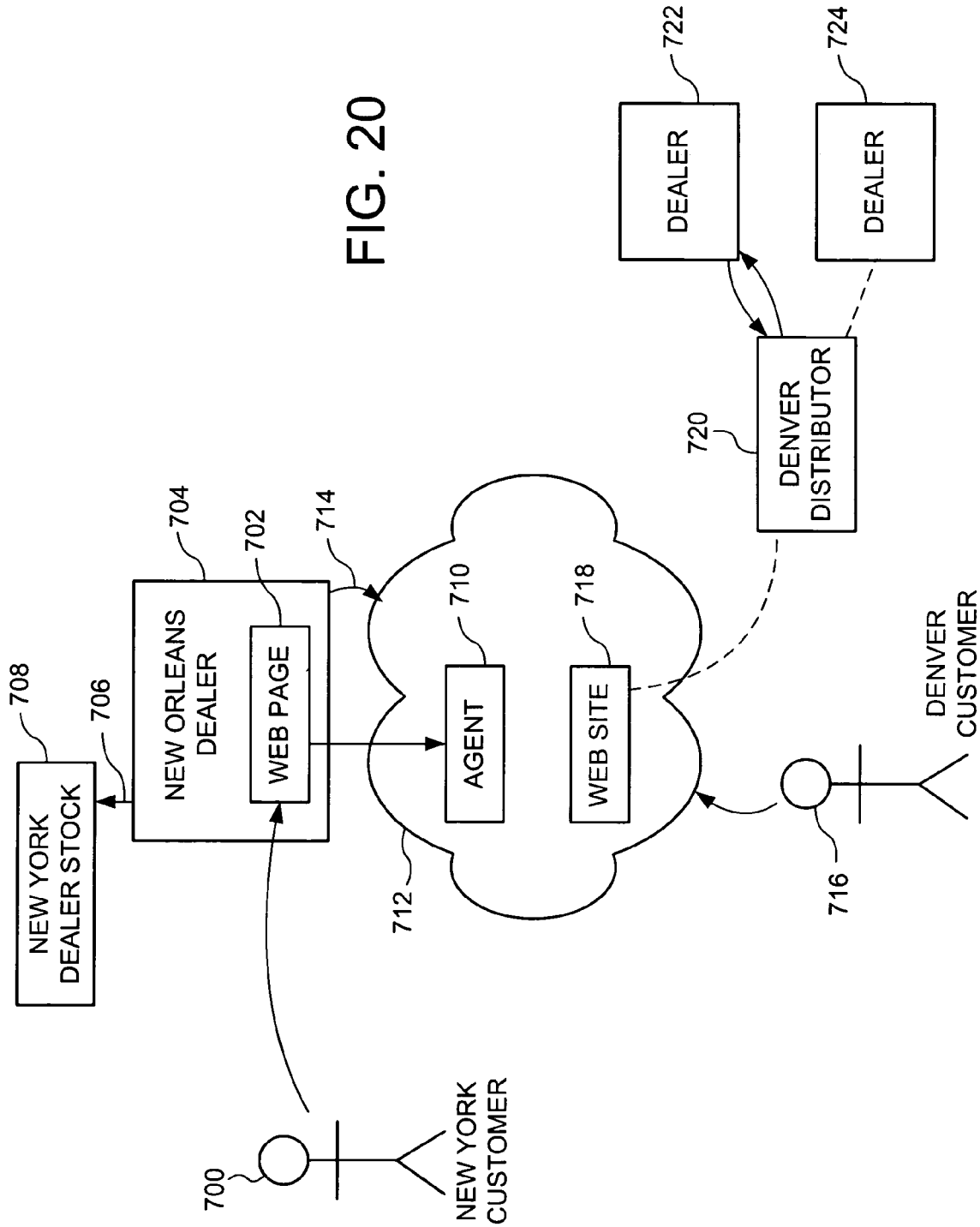
FIG. 20 illustrates an advanced distribution mechanism for tangible products processes in accordance with an embodiment of the present invention.

FIG. 20 illustrates the advanced distribution mechanism for tangible products process in accordance with an embodiment of the present invention. The Advanced distribution mechanism for tangible products process can be used for a traditional re-seller network that includes a central manufacturer, dealers and distributors that supply dealers. In some cases a dealer buys inventory directly from a manufacturer or from a distributor. To illustrate how the advanced distribution mechanism for tangible products process works, a New York customer 700 decides to buy a product through a New Orleans dealer web page 702. Web page 702 is hosted on an advanced distribution mechanism for tangible products on a managed environment 704. The advanced distribution mechanism for tangible products infrastructure recognizes that the customer 700 is in New York and automatically makes a direct connection 706 with a New York Dealer's advanced distribution mechanism for tangible products managed environment 708 and checks inventory. Alternately, if the NY dealer 708 is not online, an agent 710, located on the manufacturer Advanced distribution mechanism for tangible products environment 712, can check the NY Dealer's 708 inventory at a later time. If the NY dealer 708 has stock, the NY customer 700 will receive the product (not shown) from the NY Dealer 708. A report of the sale 714 is then sent from the New Orleans dealer 704 to the manufacturer advanced distribution mechanism for tangible products environment 712. Since the NY dealer 708 actually fulfilled the order, the NY dealer 708 as well as the New Orleans dealer 704 will receive credit for the sale. The advanced distribution mechanism for tangible products process 310, in this example, was able to capture the sale at the first point of interest, the New Orleans dealer website 702. This is important because the NY customer wasn't merely given a referral to go to a local dealer or even worse, not informed at all about a local option. Also, since the advanced distribution mechanism for tangible products process is able to check inventory of a local dealer, local dealers do not lose sales to out of town dealer websites. Additionally, both the out of town dealer and local dealer receive credit for the sale which contributes to a happy sale force. Furthermore, the local dealer will more readily help the local customer with post-sale issues, for example, a warranty repair, even though the product order was not initially placed with that dealer.

Another example of how the advanced distribution mechanism for tangible products process functions is that a Denver customer 716 places an order for a product on a corporate website 718 hosted on the manufacturer advanced distribution mechanism for tangible products environment 712. Information for the sale captured at the website 718. The manufacturer Advanced distribution mechanism for tangible products environment 712 will then check with a Denver distributor manufacturer advanced distribution mechanism for tangible products environment 720 to see if the requested product is available. The Denver distributor manufacturer advanced distribution mechanism for tangible products environment 720 then checks with local dealers 722 and 724. The product is then delivered locally to the Denver customer 716. In the event that the requested product is not available locally, the manufacturer can ship directly to the customer 716. Again, the sale was captured at the first point of interest (corporate website 718) and can be potentially fulfilled local to the Denver customer 716. Since the customer 716 was not referred to a local dealer, the customer 716 was not potentially driven away to a competitor that does allow online product orders. Another advantage of the advanced distribution mechanism for tangible products process is that the all of transactions are distributed. As a result, the manufacturer is not required to make a large initial capital investment and does not need to support an in-house information technology support team.

While this invention has been described in terms of exemplary embodiments, it will be appreciated by those skilled in the art that certain modifications, permutations and equivalents thereof are within the inventive scope of the present invention. It is therefore intended that the following appended claims include all such modifications, permutations and equivalents as fall within the true scope of the present invention.

What is claimed is:

1. A method for communication over a network that allows for the authentication of individuals and control of information comprising:
   initiating a communication from a first user via a first client machine to a second user via a second client machine utilizing an augmented email address that functions appropriately only between the first user and the second user, wherein augmented email address contains a public encryption key;
   receiving at the second client machine the communication utilizing the augmented email address and validating that it was received from the first user via the first client machine.

2. The method as recited in claim 1, wherein the public encryption key is self-validating because the email address functions appropriately only between the first user and the second user.

3. The method as recited in claim 1, wherein the communication between the first and second users is encrypted utilizing the public encryption key.

4. A method for selling a product over a network that allows for the authentication of individuals and control of information comprising:
   establishing a first identity by an individual with a central server;
   establishing a second identity by a product supplier with said central server;
   contacting by said individual to said product supplier resulting in a communication that takes place over said network, wherein said product supplier recognizes said first identity, wherein said communication results in a sale of a product;
   sending said product to said individual;
   notifying said central server that said product was sent; and
   releasing a payment authorized by said central server for said product to said product supplier on behalf of said individual.

5. The method as recited in claim 4, wherein establishing said second identity occurs before establishing said first identity.

6. The method as recited in claim 4, wherein said central server is at least two separate machines in communication over said network.

7. A method for distributing products via a network that allows for the authentication of individuals and control of information comprising:
- establishing a first identity for a first dealer with a discovery machine linked to said network;
- providing a dealer website on said network wherein said dealer website corresponds to said first dealer in a first geographic area;
- capturing a customer sale for a product on said dealer website for a customer, wherein said customer resides in a second geographic area;
- establishing a second identity for a second dealer with at least one of said discovery machine linked to said network and a second discovery machine linked to said network, wherein said second dealer is located in said second geographic area;
- establishing a direct connection between said first and said second dealer on said network;
- checking for said product in an inventory of a said second dealer via said direct connection;
- delivering said product to said customer if said product is present in said inventory;
- reporting said customer sale to a central server on said network from said first dealer; and
- providing a sales credit from said central server to both said first and second dealers.

8. The method as recited in claim 7, wherein said discovery machine and said second discovery machine are in communication over said network.

9. The method as recited in claim 7, wherein at least one of said discovery machine and said second discovery machine are said central server.

10. Method of creating a managed information communication agreement (MICA), the method comprising:
- generating a new public/private key pair;
- converting the public key of the public/private key pair into a string to create a key field of the MICA;
- selecting the desired value for a credential field of the MICA and retrieve the value of each item that is desired for inclusion in the credential field;
- computing a hash of information drawn from the credential field and the key field;
- encrypting the computed hash using the private key of the public/private key pair;
- converting the encrypted computed hash into a string to produce a validation field; and
- assembling the MICA by concatenating the key field, the validation field, and the credential field.

11. The method of creating a MICA of claim 10, wherein the new public/private key pair generated is limited in usefulness to a single relationship among a predetermined set of plural user identities.

12. The method of creating a MICA of claim 10, wherein the credential field includes an email address of an intended recipient.

13. The method of creating a MICA of claim 10, wherein the credential field includes credential information selected from the group consisting of: IP address of a mail server used by an intended recipient and custom mail attributes.

14. A method for validation of a managed information communication agreement (MICA) associated with an electronic item, the method comprising:
- confirming that the electronic item received contains credentials specified by a credential field of the MICA;
- computing a hash based on information from the electronic item, including values of the credential field and a key field of the MICA;
- decrypting a validation field of the MICA using a private key and a public key of the MICA;
- encrypting the computed hash using the private key of the MICA;
- converting the encrypted computed hash into a string;
- comparing the string to the validation field; and
- validating to an owner of the MICA relationship that the electronic item represents a legitimate use of the MICA if the values of the string and the validation field are the same.

15. A computer program product for enabling a computer to create a managed information communication agreement (MICA) comprising:
- software instructions for enabling the computer to perform predetermined operations, and
- a computer readable medium bearing the software instructions;
- the predetermined operations including the steps of:
  - generating a new public/private key pair;
  - converting the public key of the public/private key pair into a string to create a key field of the MICA;
  - selecting the desired value for a credential field of the MICA and retrieve the value of each item that is desired for inclusion in the credential field;
  - computing a hash of information drawn from the credential field and the key field;
  - encrypting the computed hash using the private key of the public/private key pair;
  - converting the encrypted computed hash into a string to produce a validation field; and
  - assembling the MICA by concatenating the key field, the validation field, and the credential field.

16. The computer program product of claim 15, wherein the credential field includes an email address of an intended recipient.

17. The computer program product of claim 15, wherein the credential field includes credential information selected from the group consisting of: IP address of a mail server used by an intended recipient and custom mail attributes.

18. A computer program product for enabling a computer to validate a managed information communication agreement (MICA) associated with an electronic item comprising:
- software instructions for enabling the computer to perform predetermined operations, and
- a computer readable medium bearing the software instructions;
- the predetermined operations including the steps of:
  - confirming that the electronic item received contains credentials specified by a credential field of the MICA;
  - computing a hash based on information from the electronic item, including values of the credential field and a key field of the MICA;
  - decrypting a validation field of the MICA using a private key and a public key of the MICA;
  - encrypting the computed hash using the private key of the MICA;
  - converting the encrypted computed hash into a string;
  - comparing the string to the validation field; and
  - validating to an owner of the MICA relationship that the electronic item represents a legitimate use of the MICA if the values of the string and the validation field are the same.

19. A method for communication over a network that allows for the authentication of individuals and control of information comprising:

initiating a communication from a first user via a first client machine to a predetermined group of users via respective client machines of the group of users utilizing an managed information communication agreement (MICA) that functions appropriately only between the first user and the predetermined group of users;

receiving at the respective client machines of the group of users the communication utilizing the MICA and validating that it was received from the first user via the first client machine.

20. A method for communication over a network that allows for the authentication of individuals of a group and control of information comprising:

registering with a discovery machine a group of plural users, wherein each of the plural users maintains a respective client machine, wherein the respective client machines of the plural users and the discovery machine are coupled to a network;

initiating a communication from one of the plural users via that user's respective client machine to the rest of the group of plural users via their respective client machines through said discovery machine;

determining that the rest of the group of plural users will accept the communication;

establishing a direct link between the respective client machines of the plural users; and delivering said communication.

* * * * *